United States Patent
Inada et al.

(10) Patent No.: US 10,883,048 B2
(45) Date of Patent: Jan. 5, 2021

(54) POLYMERIZABLE COMPOSITION INCLUDING POLYMERIZABLE LIQUID CRYSTAL COMPOUND, FILM, AND METHOD OF MANUFACTURING FILM

(71) Applicant: FUJIFILM Corporation, Tokyo (JP)

(72) Inventors: Hiroshi Inada, Ashigarakami-gun (JP); Shunya Katoh, Ashigarakami-gun (JP); Akihiro Anzai, Ashigarakami-gun (JP); Yuki Saiki, Ashigarakami-gun (JP)

(73) Assignee: FUJIFILM Corporation, Tokyo (JP)

(*) Notice: Subject to any disclaimer, the term of this patent is extended or adjusted under 35 U.S.C. 154(b) by 218 days.

(21) Appl. No.: 15/903,314

(22) Filed: Feb. 23, 2018

(65) Prior Publication Data

US 2018/0179445 A1 Jun. 28, 2018

Related U.S. Application Data

(63) Continuation of application No. PCT/JP2016/077199, filed on Sep. 15, 2016.

(30) Foreign Application Priority Data

Sep. 16, 2015 (JP) .................. 2015-182573

(51) Int. Cl.

| | | |
|---|---|---|
| C09K 19/38 | (2006.01) | |
| C09K 19/54 | (2006.01) | |
| C09K 19/56 | (2006.01) | |
| C09K 19/04 | (2006.01) | |
| C08F 220/10 | (2006.01) | |
| C08F 290/06 | (2006.01) | |
| C08G 65/26 | (2006.01) | |
| C08L 75/08 | (2006.01) | |
| C08L 75/14 | (2006.01) | |
| C09K 19/20 | (2006.01) | |
| C09K 19/30 | (2006.01) | |

(52) U.S. Cl.
CPC ........ *C09K 19/3885* (2013.01); *C08F 220/10* (2013.01); *C08F 290/06* (2013.01); *C08G 65/26* (2013.01); *C08L 75/08* (2013.01); *C08L 75/14* (2013.01); *C09K 19/20* (2013.01); *C09K 19/3068* (2013.01); *C09K 19/54* (2013.01); *C09K 19/56* (2013.01); *C09K 2019/0448* (2013.01); *C09K 2219/03* (2013.01)

(58) Field of Classification Search
None
See application file for complete search history.

(56) References Cited

U.S. PATENT DOCUMENTS

| | | | | |
|---|---|---|---|---|
| 2003/0224175 A1* | 12/2003 | Morita | ............... | C09K 19/3068 428/413 |
| 2008/0108727 A1* | 5/2008 | Roberts | .................... | C09D 4/00 522/172 |
| 2015/0042942 A1* | 2/2015 | Hatanaka | ............. | G02B 5/3016 349/194 |

FOREIGN PATENT DOCUMENTS

| | | |
|---|---|---|
| JP | 2007-106998 A | 4/2007 |
| JP | 2010024438 A * | 2/2010 |
| JP | 2010-509457 A | 3/2010 |
| JP | 5594554 B1 | 9/2014 |
| WO | 2015/115390 A1 | 8/2015 |

OTHER PUBLICATIONS

English translation of JP2010024438. (Year: 2010).*
International Search Report dated Dec. 6, 2016 issued by the International Searching Authority in International Application No. PCT/JP2016/077199.
International Preliminary Report on Patentability with the translation of Written Opinion dated Mar. 20, 2018 issued by the International Bureau in International Application No. PCT/JP2016/077199.
Extended European Search Report dated Jul. 12, 2018, from the European Patent Office in counterpart European Application No. 16846544.1.

* cited by examiner

*Primary Examiner* — Geraldina Visconti
*Assistant Examiner* — Anna Malloy
(74) *Attorney, Agent, or Firm* — Sughrue Mion, PLLC

(57) ABSTRACT

A polymerizable composition includes a polymerizable liquid crystal compound of Formula (I) and a urethane (meth) acrylate monomer including a urethane bond and three or more (meth)acryloyl groups:

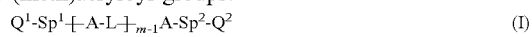

$$Q^1\text{-}Sp^1\text{-}[\text{-}A\text{-}L\text{-}]_{m-1}A\text{-}Sp^2\text{-}Q^2 \qquad (I)$$

In Formula (I), A represents a cyclic divalent group (at least one is a divalent saturated hydrocarbon ring group), L preferably represents —C(=O)O— or —OC(=O)—, m represents 3 to 12, $Sp^1$ and $Sp^2$ preferably are alkylene, and any one of $Q^1$ and $Q^2$ represents a polymerizable group. A film including a layer obtained by curing the polymerizable composition; and a film adjacently including a layer obtained by curing the polymerizable composition including a polymerizable liquid crystal compound represented by Formula (I) and a layer obtained by curing a composition including a urethane (meth)acrylate monomer and a manufacturing method thereof, are also disclosed. The polymerizable composition includes a polymerizable liquid crystal compound having low birefringence and provides a highly durable optical film.

13 Claims, No Drawings

POLYMERIZABLE COMPOSITION INCLUDING POLYMERIZABLE LIQUID CRYSTAL COMPOUND, FILM, AND METHOD OF MANUFACTURING FILM

CROSS-REFERENCE TO RELATED APPLICATIONS

This application is a continuation of PCT International Application No. PCT/JP2016/077199 filed on Sep. 15, 2016, which claims priority under 35 U.S.C § 119 (a) to Japanese Patent Application No. 2015-182573 filed on Sep. 16, 2015, the entire content of which is incorporated herein by reference.

BACKGROUND OF THE INVENTION

1. Field of the Invention

The present invention relates to a polymerizable composition including a polymerizable liquid crystal compound. The present invention also relates to a film produced by using a polymerizable composition and a method of manufacturing a film.

2. Description of the Related Art

Various optical films such as a retardation film and a reflection film can be produced by using a polymerizable liquid crystal compound. A birefringence of the polymerizable liquid crystal compound is one of the properties greatly relating to the optical properties of the obtained optical film. For example, a reflection film having high selectivity in a reflection wavelength range can be obtained by using a film obtained by fixing a cholesteric liquid crystalline phase formed by using a polymerizable liquid crystal compound having low birefringence. WO2015/115390A discloses a liquid crystal compound having a divalent saturated hydrocarbon ring group in a mesogen portion as a polymerizable liquid crystal compound having low birefringence.

SUMMARY OF THE INVENTION

A film having a fixed cholesteric liquid crystalline phase formed by using a polymerizable liquid crystal compound having low birefringence as the compound disclosed in WO2015/115390A has high selectivity in a reflection wavelength range as described above. That is, since a half-width of a reflection wavelength range is small, a change of the selective reflection wavelength easily influences on the reflectivity in a specific wavelength in practical application. Generally, deterioration of a film causes a change of a selective reflection wavelength, and thus a film having a fixed cholesteric liquid crystalline phase formed by using a polymerizable liquid crystal compound having low birefringence is more required to have durability such as temperature and humidity resistance.

An object of the present invention is to provide a polymerizable composition that can provide an optical film having high durability as a polymerizable composition including a polymerizable liquid crystal compound having low birefringence. Another object of the present invention is to provide an optical film such as a retardation film having low birefringence or a reflection film having high selectivity in a reflection wavelength range as a film having high durability and a method of manufacturing such a film.

In order to achieve the above objects, the present inventors have conducted research in various ways, to find that, in a case of adding polyfunctional urethane acrylate to a polymerizable composition including a liquid crystal compound having a divalent saturated hydrocarbon ring group, it is possible to obtain a film having high durability together with desired optical characteristics from this polymerizable composition, and further conducted research on this knowledge to complete the present invention.

That is, the present invention is to provide <1> to <18> below.

<1> A polymerizable composition comprising: a polymerizable liquid crystal compound; and a urethane (meth)acrylate monomer,
in which the polymerizable liquid crystal compound is represented by Formula (I), and
in which the urethane (meth)acrylate monomer includes a urethane bond represented by Formula (II) and three or more (meth)acryloyl groups,

in Formula (I),

A's each independently represent a cyclic divalent group that may have a substituent, at least one A is a divalent saturated hydrocarbon ring group that may have a substituent, L represents a single bond, or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, m represents an integer of 3 to 12, Sp$^1$ and Sp$^2$ each independently represent a single bond or a linking group selected from the group consisting of a linear or branched alkylene group having 1 to 20 carbon atoms and a group in which one or more —CH$_2$-'s in a linear or branched alkylene group having 1 to 20 carbon atoms are substituted with —O—, —S—, —NH—, —N(CH$_3$)—, —C(=O)—, —OC(=O)—, or —C(=O)O—, and Q$^1$ and Q$^2$ each independently represent a hydrogen atom or a polymerizable group selected from the group consisting of groups represented by Formulae Q-1 to Q-5:

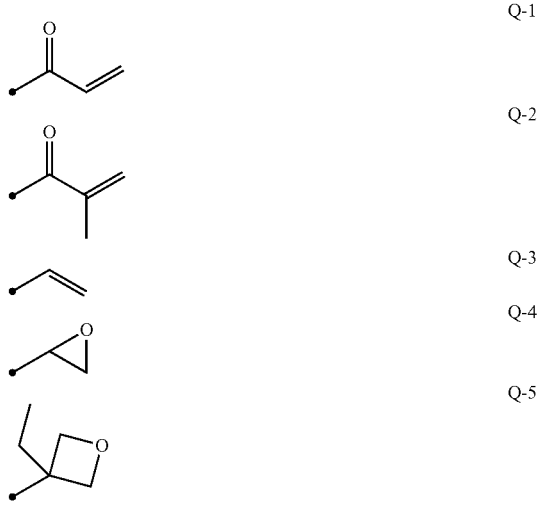

here, any one of Q$^1$ and Q$^2$ represents a polymerizable group, and

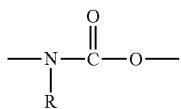
(II)

in Formula (II), R represents a hydrogen atom or a hydrocarbon group.

<2> The polymerizable composition according to <1>, in which, in Formula (II), R represents a hydrogen atom.

<3> The polymerizable composition according to <1> or <2>, in which A's each independently represent a cyclohexylene group that may have a substituent or a phenylene group that may have a substituent, and the polymerizable liquid crystal compound includes a cyclohexylene group that may have at least one substituent and a phenylene group that may have at least one substituent.

<4> The polymerizable composition according to <3>, in which the cyclohexylene group is an unsubstituted cyclohexylene group, and the phenylene group has a group represented by $-C(=O)-X^3-Sp^3-Q^3$, as a substituent, here, $X^3$ represents a single bond, $-O-$, $-S-$, or $-N(Sp^4-Q^4)-$, or a nitrogen atom in which $Q^3$ and $Sp^3$ form a ring structure together, $Sp^3$ and $Sp^4$ each independently represent a single bond and a linking group selected from the group consisting of a linear or branched alkylene group having 1 to 20 carbon atoms and a group in which one or more $-CH_2-$'s in a linear or branched alkylene group having 1 to 20 carbon atoms are substituted with $-O-$, $-S-$, $-NH-$, $-N(CH_3)-$, $-C(=O)-$, $-OC(=O)-$, or $-C(=O)O-$, and $Q^3$ and $Q^4$ each independently represent a hydrogen atom, a cycloalkyl group, a group in which one or more $-CH_2-$'s in a cycloalkyl group are substituted with $-O-$, $-S-$, $-NH-$, $-N(CH_3)-$, $-C(=O)-$, $-OC(=O)-$, or $-C(=O)O-$, or any one polymerizable group selected from the group consisting of groups represented by Formulae Q-1 to Q-5.

<5> The polymerizable composition according to any one of <1> to <4>, in which both of $Q^1$ and $Q^2$ are polymerizable groups represented by Formula Q-1 or Q-2.

<6> The polymerizable composition according to any one of <1> to <5>, in which L is $-C(=O)O-$ or $-OC(=O)-$.

<7> The polymerizable composition according to any one of <1> to <6>, in which m is 3 to 5.

<8> The polymerizable composition according to any one of <1> to <7>, in which a total mass of the urethane (meth)acrylate monomer is 1 to 10 mass % with respect to the total solid content of the polymerizable composition.

<9> The polymerizable composition according to any one of <1> to <8>, further comprising: a polymerization initiator.

<10> The polymerizable composition according to any one of <1> to <9>, further comprising: a chiral compound.

<11> A film comprising: a layer obtained by curing the polymerizable composition according to any one of <1> to <10>.

<12> A film comprising: a layer obtained by curing a polymerizable composition including a polymerizable liquid crystal compound; and a layer obtained by curing a composition including a urethane (meth)acrylate monomer, in an adjacent manner, in which the polymerizable liquid crystal compound is represented by Formula (I), and in which the urethane (meth)acrylate monomer includes a urethane bond represented by Formula (II) and three or more (meth)acryloyl groups, $$Q^1\text{-}Sp^1\text{-}[\text{-}A\text{-}L\text{-}]_{m-1}\text{-}A\text{-}Sp^2\text{-}Q^2 \quad (I)$$

in Formula (I),

A's each independently represent a cyclic divalent group that may have a substituent, at least one A is a divalent saturated hydrocarbon ring group that may have a substituent, L represents a single bond, or a linking group selected from the group consisting of $-CH_2O-$, $-OCH_2-$, $-(CH_2)_2OC(=O)-$, $-C(=O)O(CH_2)_2-$, $-C(=O)O-$, $-OC(=O)-$, $-OC(=O)O-$, $-CH=CH-C(=O)O-$, and $-OC(=O)-CH=CH-$, m represents an integer of 3 to 12, $Sp^1$ and $Sp^2$ each independently represent a single bond or a linking group selected from the group consisting of a linear or branched alkylene group having 1 to 20 carbon atoms and a group in which one or more $-CH_2-$'s in a linear or branched alkylene group having 1 to 20 carbon atoms are substituted with $-O-$, $-S-$, $-NH-$, $-N(CH_3)-$, $-C(=O)-$, $-OC(=O)-$, or $-C(=O)O-$, and $Q^1$ and $Q^2$ each independently represent a hydrogen atom or a polymerizable group selected from the group consisting of groups represented by Formulae Q-1 to Q-5:

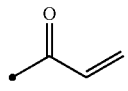
Q-1

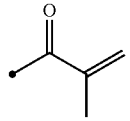
Q-2

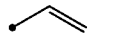
Q-3

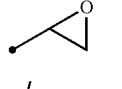
Q-4

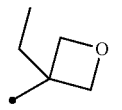
Q-5 here, any one of $Q^1$ and $Q^2$ represents a polymerizable group, and

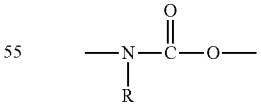
(II)

in Formula (II), R represents a hydrogen atom or a hydrocarbon group.

<13> The film according to <12>, in which A's each independently represent a cyclohexylene group that may have a substituent or a phenylene group that may have a substituent, and the polymerizable liquid crystal compound includes a cyclohexylene group that may have at least one substituent and a phenylene group that may have at least one substituent.

<14> The film according to <12> or <13>, in which L is —C(=O)O— or —OC(=O)—. <15> A method of manufacturing a film, comprising:

obtaining a film formed of a polymerizable composition including a polymerizable liquid crystal compound;

coating a surface of the film with a composition containing a urethane (meth)acrylate monomer; and irradiating a laminate obtained after the coating with ultraviolet rays, in which the polymerizable liquid crystal compound is represented by Formula (I), and in which the urethane (meth)acrylate monomer includes a urethane bond represented by Formula (II) and three or more (meth)acryloyl groups,

  (I)

in Formula (I),

A's each independently represent a cyclic divalent group that may have a substituent, at least one A is a divalent saturated hydrocarbon ring group that may have a substituent, L represents a single bond, or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, m represents an integer of 3 to 12, Sp$^1$ and Sp$^2$ each independently represent a single bond or a linking group selected from the group consisting of a linear or branched alkylene group having 1 to 20 carbon atoms and a group in which one or more —CH$_2$-'s in a linear or branched alkylene group having 1 to 20 carbon atoms are substituted with —O—, —S—, —NH—, —N(CH$_3$)—, —C(=O)—, —OC(=O)—, or —C(=O)O—, and Q$^1$ and Q$^2$ each independently represent a hydrogen atom or a polymerizable group selected from the group consisting of groups represented by Formulae Q-1 to Q-5:

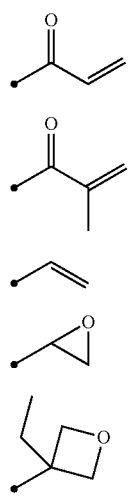

here, any one of Q$^1$ and Q$^2$ represents a polymerizable group, and

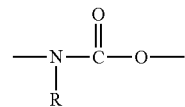  (II)

in Formula (II), R represents a hydrogen atom or a hydrocarbon group.

<16> The manufacturing method according to <15>, in which the film formed of a polymerizable composition including a polymerizable liquid crystal compound is a cured film.

<17> The manufacturing method according to <15> or <16>, in which A's each independently represent a cyclohexylene group that may have a substituent or a phenylene group that may have a substituent, and the polymerizable liquid crystal compound includes a cyclohexylene group that may have at least one substituent and a phenylene group that may have at least one substituent.

<18> The manufacturing method according to any one of <15> to <17>, in which L is —C(=O)O— or —OC(=O)—.

According to the present invention, a polymerizable composition that can provide an optical film having high durability is provided. The present invention also provides an optical film such as a retardation film having low birefringence or a reflection film having high selectivity in a reflection wavelength range as a film having high durability and further provides a method of manufacturing such a film.

DESCRIPTION OF THE PREFERRED EMBODIMENTS

Hereinafter, the present invention will be described in detail. In the present specification, the numerical range expressed by using "to" means a range including numerical values described before and after "to" as a lower limit value and an upper limit value.

In the present specification, the expression "(meth)acrylate" means "any one or both of acrylate and methacrylate". "A (meth)acryloyl group" means "any one or both of an acryloyl group and a methacryloyl group".

In the present specification, the expression "liquid crystal layer" means a layer formed by using a polymerizable composition including a polymerizable liquid crystal compound and particularly means a layer obtained by curing a polymerizable composition including a polymerizable liquid crystal compound. With respect to the liquid crystal layer, it is sufficient that optical properties of the liquid crystalline phase are maintained in the layer, and the composition in the cured film finally is not necessary to exhibit liquid crystallinity. For example, the composition may be caused to have high molecular weight due to curing reaction to lose liquid crystallinity.

In the present specification, the expression "retardation" means in-plane retardation, and means in-plane retardation in a wavelength of 550 nm, in a case where a wavelength is not mentioned. In the present specification, the in-plane retardation is measured by using a polarization retardation analyzer AxoScan manufactured by AXOMETRICS, Inc. The in-plane retardation at a wavelength of λ nm can also be measured by causing light of wavelength λ nm incident on KOBRA 21ADH or WR (manufactured by Oji Scientific Instruments Co., Ltd.) in the film normal direction.

In a case of "that may have a substituent" in the present specification, the substituent is not particularly limited, and examples thereof include a substituent selected from the group consisting of an alkyl group, a cycloalkyl group, an alkoxy group, an alkyl ether group, an amide group, an amino group, a halogen atom, and a group obtained by combining two or more of the above substituents. Examples of the substituent include a substituent represented by —C(=O)—X$^3$-Sp$^3$-Q$^3$ below.

In the present specification, an alkyl group may have a linear or branched chain shape. The number of carbon atoms of the alkyl group is preferably 1 to 30, more preferably 1 to 10, and particularly preferably 1 to 6. Examples of the alkyl group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a 1,1-dimethylpropyl group, an n-hexyl group, an isohexyl group, a linear or branched heptyl group, an octyl group, a nonyl group, a decyl group, an undecyl group, and a dodecyl group. The above description regarding the alkyl group is also applied to an alkoxy group containing an alkyl group. In the present specification, specific examples of the alkylene group in a case of being referred to as an alkylene group include a divalent group obtained by removing one arbitrary hydrogen atom from each of the above examples of the alkyl group. Examples of the halogen atom include a fluorine atom, a chlorine atom, a bromine atom, and an iodine atom.

In the present specification, the number of carbon atoms of the cycloalkyl group is preferably 3 to 20, more preferably 5 or greater, preferably 10 or less, more preferably 8 or less, and even more preferably 6 or less. Examples of cycloalkyl groups include a cyclopropyl group, a cyclobutyl group, a cyclopentyl group, a cyclohexyl group, a cycloheptyl group, and a cyclooctyl group.

In the present specification, an arylene group is a divalent group formed by removing two hydrogen atoms (hydrogen radicals) from an aromatic compound. The aromatic compound is preferably a 5-membered to 18-membered ring. A heteroarylene group is a divalent group formed by removing two hydrogen atoms (hydrogen radicals) from an aromatic heterocyclic compound. The aromatic heterocyclic compound is preferably a 5-membered to 18-membered ring.

<Polymerizable Composition>

The polymerizable composition of the present invention includes a polymerizable liquid crystal compound represented by Formula (I) and a urethane (meth)acrylate monomer including a urethane bond and three or more (meth)acryloyl groups represented by Formula (II).

The present inventors have found that the durability of a film including a layer obtained by curing a polymerizable composition including a polymerizable liquid crystal compound having a divalent saturated hydrocarbon ring group in a mesogen portion represented by Formula (I) was improved by adding a urethane (meth)acrylate monomer to a polymerizable composition, and the optical characteristics of the film were also improved. It is considered that the improvement of the durability is caused since the urethane (meth)acrylate monomer functions as a crosslinking agent and strengthening the structure of a polymer in the layer obtained by curing the polymerizable composition, but this is an incredible result since a urethane structure can form a hydrogen bond so as to gives an influence on liquid crystallinity, and thus the optical characteristics are changed.

The polymerizable composition of the present invention may include other components such as another liquid crystal compound, a chiral compound, a polymerization initiator, and an alignment control agent, in addition to the polymerizable liquid crystal compound represented by Formula (I) and a urethane (meth)acrylate monomer. Hereinafter, respective components are described.

[Polymerizable Liquid Crystal Compound Represented by Formula (I)]

$$Q^1\text{-Sp}^1\text{-}[\text{-A-L-}]_{m-1}\text{A-Sp}^2\text{-Q}^2 \qquad (I)$$

The polymerizable liquid crystal compound represented by Formula (I) has m cyclic divalent groups that may have a substituent and are represented by A and has a divalent saturated hydrocarbon ring group that may have at least one substituent as A. m A's may be identical to or different from each other. It is preferable to have a divalent unsaturated hydrocarbon ring group that may have at least one substituent.

m represents an integer of 3 to 12, preferably an integer of 3 to 9, more preferably an integer of 3 to 7, and even more preferably an integer of 3 to 5.

Examples of the cyclic divalent group include a divalent saturated hydrocarbon ring group, a divalent unsaturated hydrocarbon ring group, a divalent saturated heterocyclic group, or a divalent unsaturated heterocyclic group. The divalent unsaturated hydrocarbon ring group includes an arylene group. The divalent unsaturated heterocyclic group includes a heteroarylene group.

More specific examples thereof include a divalent group formed by removing two hydrogen atoms (hydrogen radicals) from cyclic compounds provided below, but the present invention is not limited thereto.

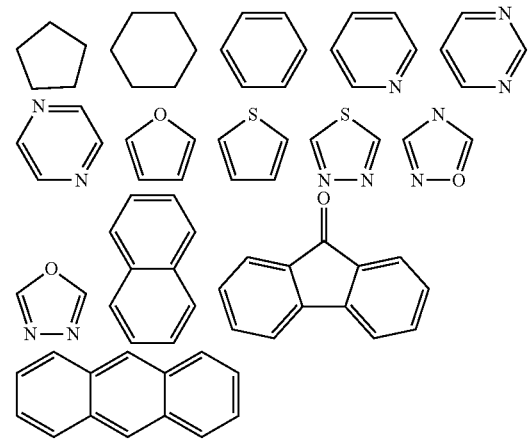

As the cyclic compound, benzene or cyclohexane is particularly preferable. Positions at which two hydrogen atoms are removed are not particularly limited, but it is preferable that the positions are not the same carbon atoms or hydrogen bonded to an adjacent atom. In a case where the cyclic compound is benzene, the cyclic compound is preferably at least at a meta position or a para position and particularly preferably at the para position.

The cyclic divalent group is preferably a divalent saturated hydrocarbon ring group or a divalent unsaturated hydrocarbon ring group. The divalent unsaturated hydrocarbon ring group is preferably a phenylene group and the divalent saturated hydrocarbon ring group is preferably a cyclohexylene group. The phenylene group is preferably a 1,4-phenylene group, the cyclohexylene group is preferably a 1,4-cyclohexylene group, and more preferably a trans-1,4-cyclohexylene group.

In a case where the cyclic divalent group may have a substituent, the substituent thereof is preferably selected from the group consisting of an alkyl group, an alkoxy group, and a group represented by —C(=O)—X$^3$-Sp$^3$-Q$^3$.

In a case where the cyclic divalent group that may have a substituent, the number of substitutions and the substitution positions are not particularly limited, and each of the phenylene group and the cyclohexylene group may have one to four substituents. In a case where the cyclic divalent group has two or more substituents, the two or more substituents may be identical to or different from each other. The divalent unsaturated hydrocarbon ring group such as a phenylene group preferably has one or two substituents and more preferably has only one substituent. The divalent saturated hydrocarbon ring group such as a cyclohexylene group preferably does not have a substituent.

The polymerizable liquid crystal compound represented by Formula (I) preferably includes a 1,4-phenylene group that may have at least one substituent and a trans-1,4-cyclohexylene group that may have at least one substituent. The trans-1,4-cyclohexylene group that may have a substituent is preferably included in a plurality of A's of the polymerizable liquid crystal compound represented by Formula (I) as A near the center.

The polymerizable liquid crystal compound represented by Formula (I) preferably has a partial structure represented by Formula (V).

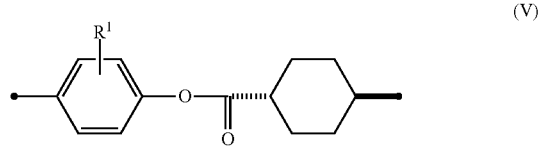
(V)

It is preferable to further include a partial structure represented by Formula (V-1).

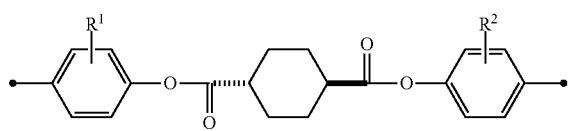
(V-1)

Black dots in Formulae (V) and (V-1) represent bonding positions of other portions of Formula (I). The partial structure represented by Formula (V) may be included as a portion of the partial structure represented by the following formula in Formula (I).

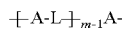

In Formulae (V) and (V-1), R$^1$ and R$^2$ each independently represent a hydrogen atom or a substituent and is preferably a group selected from the group consisting of a hydrogen atom, an alkyl group, an alkoxy group, and a group represented by —C(=O)—X$^3$-Sp$^3$-Q$^3$.

The substituent in a case where the phenylene group has a substituent is particularly preferably a substituent selected from the group consisting of —C(=O)—X$^3$-Sp$^3$-Q$^3$.

Here, X$^3$ represents a single bond, —O—, —S—, or —N(Sp$^4$-Q$^4$)-, or represents a nitrogen atom that forms a ring structure together with Q$^3$ and Sp$^3$. Sp$^3$ and Sp$^4$ each independently represent a single bond or a linking group selected from the group consisting of a linear or branched alkylene group having 1 to 20 carbon atoms and a group in which one or more —CH$_2$-'s in a linear or branched alkylene group having 1 to 20 carbon atoms are substituted with —O—, —S—, —NH—, —N(CH$_3$)—, —C(=O)—, —OC(=O)—, or —C(=O)O—.

Q$^3$ and Q$^4$ each independently represent a hydrogen atom, a cycloalkyl group, a group in which one or more —CH$_2$-'s in a cycloalkyl group are substituted with —O, S, NH, —N(CH$_3$)—, —C(=O)—, —OC(=O)—, or —C(=O)O—, or any one polymerizable group selected from the group consisting of groups represented by Formulae Q-1 to Q-5.

Specific examples of the group in which one or more —CH$_2$-'s in the cycloalkyl group are substituted with —O—, —S—, —NH—, —N(CH$_3$)—, —C(=O)—, —OC(=O)—, or —C(=O)O— include a tetrahydrofuranyl group, a pyrrolidinyl group, an imidazolidinyl group, a pyrazolidinyl group, a piperidyl group, a piperazinyl group, and a morpholinyl group. The substitution position is not particularly limited. Among these, a tetrahydrofuranyl group is preferable, and a 2-tetrahydrofuranyl group is particularly preferable.

In Formula (I), L represents a single bond, or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—. L is preferably —C(=O)O— or —OC(=O)—. m L's may be identical to or different from each other.

Sp$^1$ and Sp$^2$ each independently represent a single bond or a linking group selected from the group consisting of a linear or branched alkylene group having 1 to 20 carbon atoms and a group in which one or more —CH$_2$-'s in a linear or branched alkylene group having 1 to 20 carbon atoms are substituted with —O—, —S—, —NH—, —N(CH$_3$)—, —C(=O)—, —OC(=O)—, or —C(=O)O—. Sp$^1$ and Sp$^2$ each independently and preferably represent a linear alkylene group having 1 to 10 carbon atoms in which linking groups selected from the group consisting of —O—, —OC(=O)—, and —C(=O)O— are bonded to both terminals, and a linking group formed by combining one or more groups selected from the group consisting of —OC(=O)—, —C(=O)O—, —O—, and a linear alkylene group having 1 to 10 carbon atoms, and more preferably a linear alkylene group having 1 to 10 carbon atoms in which linking groups selected from the group consisting of —O—, —OC(=O)—, and —C(=O)O— are bonded to both terminals.

Q$^1$ and Q$^2$ each independently represent a hydrogen atom or a polymerizable group selected from the group consisting of groups represented by Formulae Q-1 to Q-5. Here, any one of Q$^1$ and Q$^2$ represents a polymerizable group.

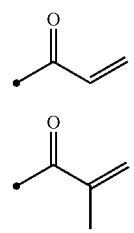

Q-1

Q-2

-continued

Q-3

Q-4

Q-5

The polymerizable group is preferably an acryloyl group (Formula Q-1) or a methacryloyl group (Formula Q-2).

Specific examples of the polymerizable liquid crystal compound represented by Formula (I) include well-known compounds disclosed in WO2015/115390A and the like and polymerizable liquid crystal compounds represented by Formulae (I-21) and (I-31).

Polymerizable Liquid Crystal Compound Represented by Formula (I-21)

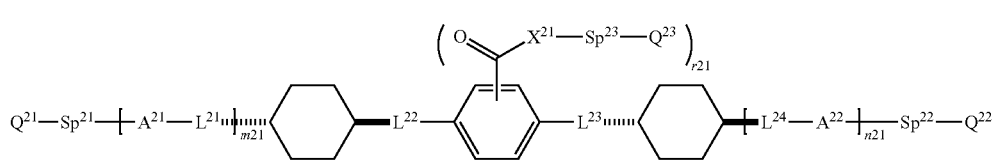

(I-21)

In the formula, $A^{21}$ and $A^{22}$ each independently represent a trans-1,4-cyclohexylene group that may have a substituent, an arylene group that may have a substituent, or a heteroarylene group that may have a substituent ($A^{21}$ and $A^{22}$ are preferably phenylene groups that may have a substituent), all of the substituent each independently represent one to four substituents selected from the group consisting of —CO—$X^{21}$-$Sp^{23}$-$Q^{23}$, an alkyl group, and an alkoxy group, m21 represents an integer of 1 or 2, n21 represents an integer of 0 or 1, in a case where m21 represents 2, n21 represents 0, in a case where m21 represents 2, two $A^{21}$'s may be identical to or different from each other, at least one of $A^{21}$ and $A^{22}$ is an arylene group that may have a substituent or a heteroarylene group that may have a substituent, $L^{21}$, $L^{22}$, $L^{23}$, and $L^{24}$ each independently represent a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, $X^{21}$ represents —O—, —S—, or —N($Sp^{25}$-$Q^{25}$)-, or represents a nitrogen atom that forms a ring structure together with $Q^{23}$ and $Sp^{23}$, $r^{21}$ represents an integer of 1 to 4, $Sp^{21}$, $Sp^{22}$, $Sp^{23}$, $Sp^{24}$, and $Sp^{25}$ each independently represent a single bond or a linking group selected from the group consisting of a linear or branched alkylene group having 1 to 20 carbon atoms and a group in which one or more —CH$_2$-'s in a linear or branched alkylene group having 1 to 20 carbon atoms are substituted with —O—, —S—, —NH—, —N(CH$_3$)—, —C(=O)—, —OC(=O)—, or —C(=O)O—, $Q^{21}$ and $Q^{22}$ each independently represent any one polymerizable group selected from the group consisting of groups represented by Formulae Q-1 to Q-5, $Q^{23}$ represents a hydrogen atom, a cycloalkyl group, a group in which one or more —CH$_2$-'s in a cycloalkyl group are substituted with —O—, —S—, —NH—, —N(CH$_3$)—, —C(=O)—, —OC(=O)—, or —C(=O)O—, any one polymerizable group selected from the group consisting of groups represented by Formulae Q-1 to Q-5, or a single bond in a case where $X^{21}$ is a nitrogen atom that forms a ring structure together with $Q^{23}$ and $Sp^{23}$, and $Q^{25}$ represents a hydrogen atom, a cycloalkyl group, a group in which one or more —CH$_2$-'s in a cycloalkyl group are substituted with —O—, —S—, —NH—, —N(CH$_3$)—, —C(=O)$^-$, —OC(=O)—, or —C(=O)O—, or any one polymerizable group selected from the group consisting of groups represented by Formulae Q-1 to Q-5, and, in a case where $Sp^{25}$ is a single bond, $Q^{25}$ is not a hydrogen atom.

The polymerizable liquid crystal compound represented by Formula (I-21) is also preferably a polymerizable liquid crystal compound represented by Formula (I-21) which is a structure in which 1,4-phenylene groups and trans-1,4-cyclohexylene groups exist in an alternating manner. Examples of the polymerizable liquid crystal compound represented by Formula (I-21) preferably include a structure in which m21 is 2, n21 is 0, and $A^{21}$ is a trans-1,4-cyclohexylene group that may have a substituent or an arylene group that may have a substituent (preferably a phenylene group) from $Q^{21}$ side, and a structure in which m21 is 1, n21 is 1, $A^{21}$ is an arylene group that may have a substituent, and $A^{22}$ is an arylene group that may have a substituent (preferably a phenylene group).

Polymerizable liquid crystal compound represented by Formula (I-31);

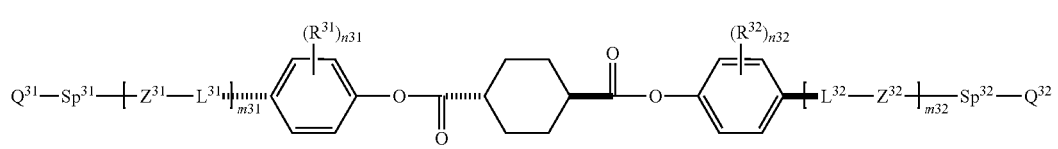

(I-31)

In the formula, $R^{31}$ and $R^{32}$ each independently represent a group selected from the group consisting of an alkyl group, an alkoxy group, and —C(=O)—$X^{33}$-$Sp^{33}$-$Q^{33}$, n31 and n32 each independently represent an integer of 0 to 4, $X^{33}$ represents a single bond, —O—, —S—, or —N($Sp^{34}$-$Q^{34}$)-, or represents a nitrogen atom that forms a ring structure together with $Q^{33}$ and $Sp^{33}$, $Z^{31}$ represents an arylene group that may have a substituent or a heteroarylene group that may have a substituent, $Z^{32}$ represents a trans-1,4-cyclohexylene group that may have a substituent, an arylene group that may have a substituent, or a heteroarylene group that may have a substituent, all of the substituents each independently represent one to four substituents selected from the group consisting of an alkyl group, an alkoxy group, and —C(=O)—$X^{33}$-$Sp^{33}$-$Q^{33}$, m31 represents an integer of 1 or 2, and m32 represents an integer of 0 to 2, in a case where m31 and m32 represent 2, two $Z^{31}$'s and two $Z^{32}$'s may be identical to or different from each other, $L^{31}$ and $L^{32}$ each independently represent a linking group selected from the group consisting of a single bond, or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, $T^{33}$ represents-$Sp^{35}$-$Q^{35}$, $Sp^{31}$, $Sp^{32}$, $Sp^{33}$, $Sp^{34}$, and $Sp^{35}$ each independently represent a single bond a linking group selected from the group consisting of a linear or branched alkylene group having 1 to 20 carbon atoms and a group in which one or more —CH$_2$-'s in a linear or branched alkylene group having 1 to 20 carbon atoms are substituted with —O—, —S—, —NH—, —N(CH$_3$)—, —C(=O)—, —OC(=O)—, or —C(=O)O—, $Q^{31}$ and $Q^{32}$ each independently represent any one polymerizable group selected from the group consisting of groups represented by Formulae (Q-1) to (Q-5), and $Q^{33}$, $Q^{34}$, and $Q^{35}$ each independently represent a hydrogen atom, a cycloalkyl group, a group in which one or more —CH$_2$-'s in a cycloalkyl group are substituted with —O—, —S—, —NH—, —N(CH$_3$)—, —C(=O)—, —OC(=O)—, or —C(=O)O—, any one polymerizable group selected from the group consisting of groups represented by Formulae (Q-1) to (Q-5), $Q^{33}$ may represent a single bond in a case where a ring structure is formed together with X and $Sp^{33}$, and $Q^{34}$ is not hydrogen atom in a case where $Sp^{34}$ is a single bond.

In the polymerizable liquid crystal compound represented by Formula (I-31), each of $Z^{31}$ and $Z^{32}$ is preferably a phenylene group that may have a substituent. Each of m31 and m32 is preferably 1.

The compound represented by Formula (I) is preferably a compound represented by Formula (I-10).

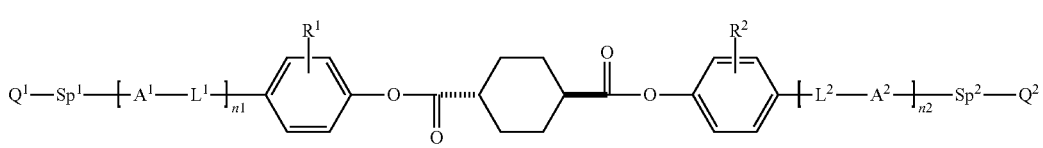

(I-10)

In the formula, $A^1$ and $A^2$ each independently represent a phenylene group that may have a substituent or a trans-1,4-cyclohexylene group that may have a substituent, and the substituents each independently represent one to four substituents selected from the group consisting of an alkyl group, an alkoxy group, and —C(=O)—$X^3$-$Sp^3$-$Q^3$, $L^1$ and $L^2$ represent a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, n1 and n2 each independently represent an integer of 0 to 9, and n1+n2 is 9 or less.

Formula (I-10) is preferably a structure in which a phenylene group that may have a substituent and a trans-1,4-cyclohexylene group that may have a substituent (preferably an unsubstituted trans-1,4-cyclohexylene group) are arranged in an alternate manner.

Examples of the polymerizable liquid crystal compound represented by Formula (I) are provided, but the present invention is not limited to these examples.

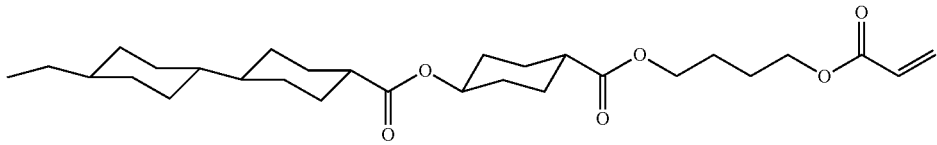

-continued
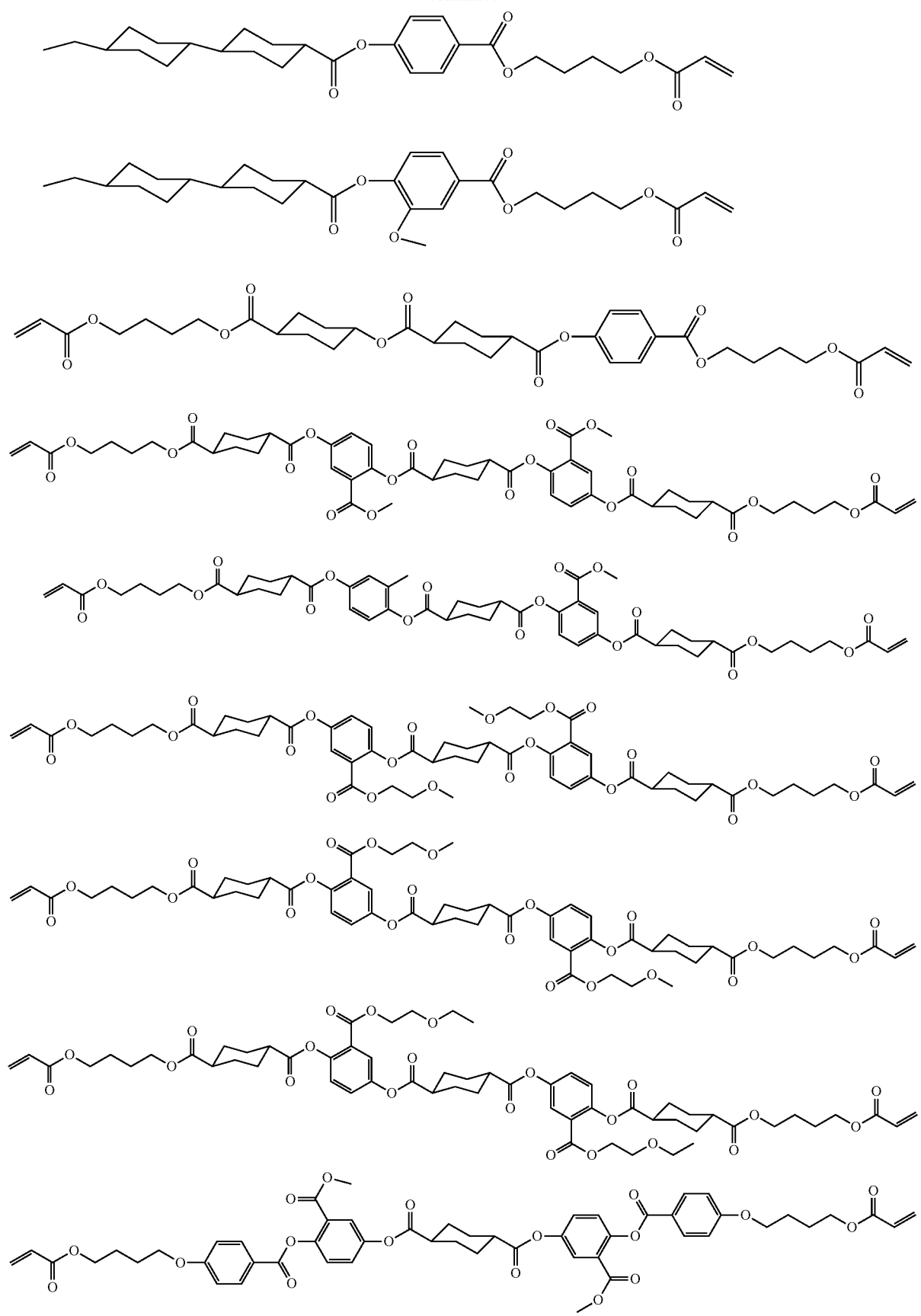

-continued
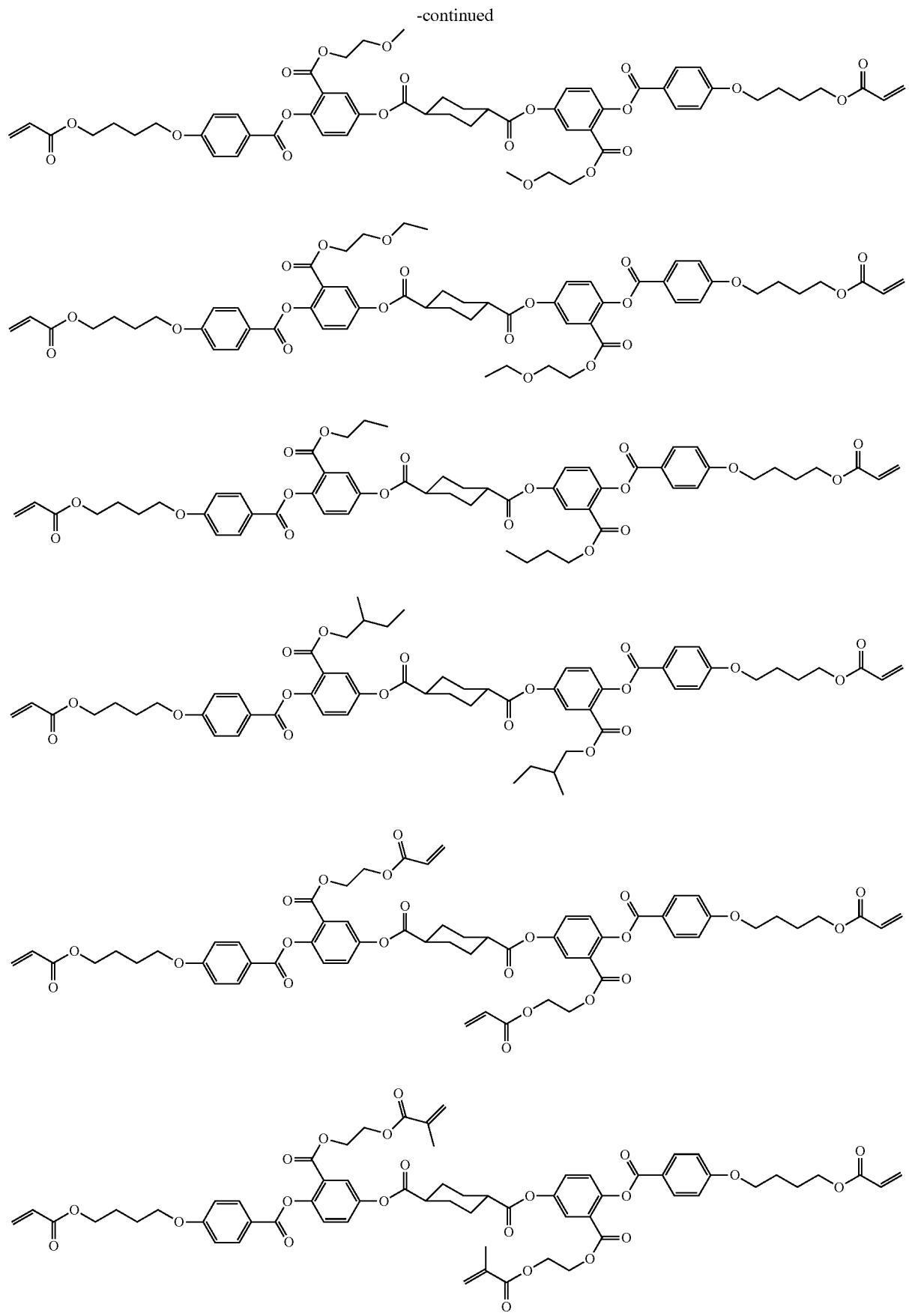

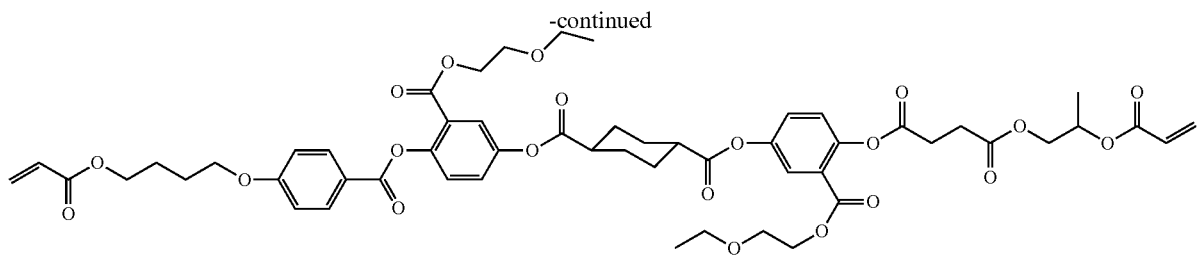

The polymerizable liquid crystal compound represented by Formula (I) can be manufactured by the well-known methods, and for example, the polymerizable liquid crystal compound can be manufactured by the following method.

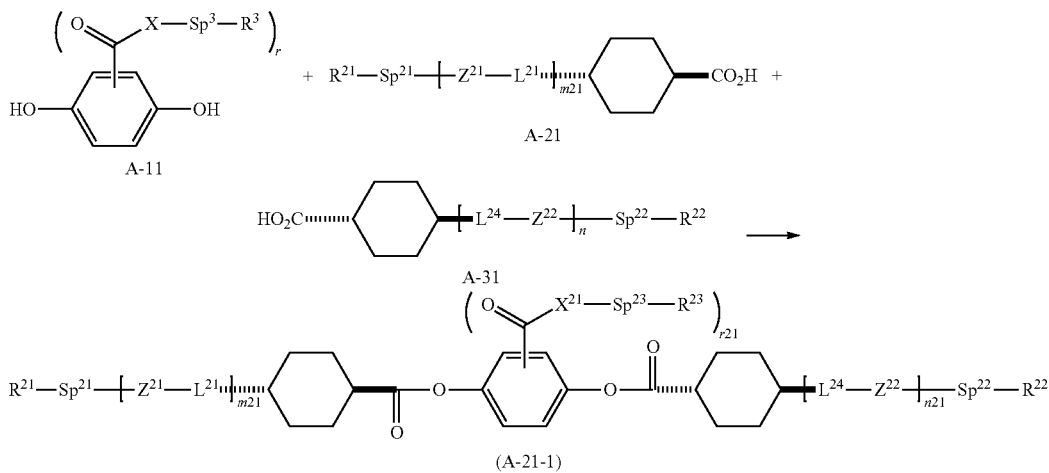

For example, in Formula (A-21), in a case where $L_2$ is —C(=O)O— and $L_2$ is —OC(=O)—, the polymerizable liquid crystal compound can be manufactured by esterification using a phenol (or alcohol) derivative A-11 and carboxylic acid derivatives A-21 and A-31.

For example, as described below, the polymerizable liquid crystal compound represented by Formula (I-10) can be manufactured by a method in which trans-1,4-cyclohexanedicarboxylic acid and phenol B are used as a starting material via an intermediate A.

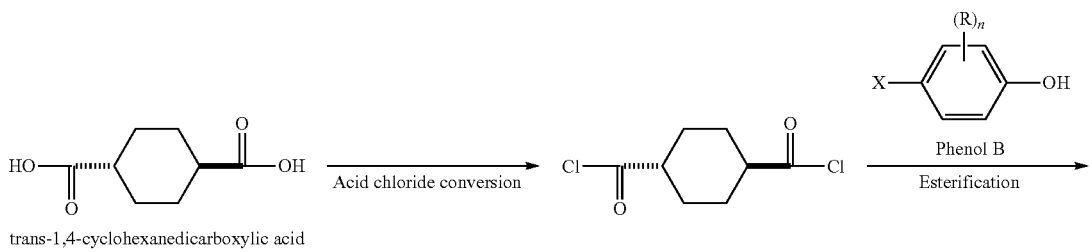

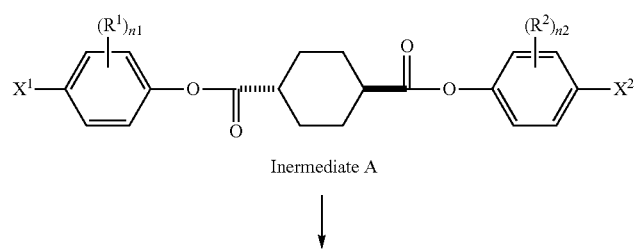

Inermediate A

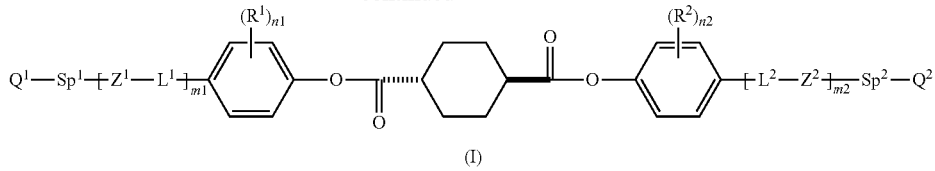

(I)

As an example, a case where $L_1$ in Formula (I-10) is —COO— and $L_2$ is —OCO— is specifically described.

First, in the manufacturing of the intermediate A, phenol B which is a raw material thereof is 1,4-diphenol, it is preferable to primarily proceed a reaction of phenol on only one side, in view of preventing by-production of a polymer. Specifically, it is preferable that phenol B is used in a large excess or phenol B having a structure in which one hydroxyl group is protected or the substituent R represents —C(=O)—X—Sp$^a$-Q$^3$ is used as described below.

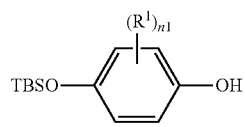

Phenol B in which one side is protected

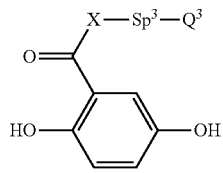

Phenol B in which R has a specific structure

As the protecting group of the hydroxyl group, for example, a t-butyldimethylsilyl group (TBS group). In a case where R represents —C(=O)—X—Sp$^a$-Q$^3$, there is a difference in reactivity between the ortho position of R and the hydroxyl group in the meta position, it is possible to react only one hydroxyl group without protecting the hydroxyl group.

As the structure of the phenol B, it is preferable that a substituent R represents —C(=O)—X—Sp$^3$-Q$^3$, since a protecting step can be omitted.

With respect to the manufacturing of the polymerizable liquid crystal compound represented by Formula (I), examples of the method of esterifying the carboxylic acid C and the intermediate A include a method of activating the carboxylic acid C and causing the intermediate A to act in the presence of a base and a method of directly esterifying the carboxylic acid C and the intermediate A by using a condensing agent such as carbodiimide.

Examples of the method of activating the carboxylic acid C include a method of acid chloride conversion with thionyl chloride, oxalyl chloride, or the like or a method of causing the carboxylic acid C to act with mesyl chloride and adjusting mixed acid anhydride.

In view of a by-product, a method of activating the carboxylic acid C is more preferable.

Because absorption in the visible light region is extremely small regardless of the type of the substituent of the cyclic divalent group and the linking group, the polymerizable liquid crystal compound represented by Formula (I) satisfies a plurality of characteristics of colorlessness and transparency, a wide liquid crystalline phase range, easy dissolution to a solvent, and easy polymerization. Based on this, the cured film produced by using the polymerizable composition containing the polymerizable liquid crystal compound represented by Formula (I) can satisfy a plurality of characteristics of sufficient hardness, colorlessness and transparency, and satisfactory weather fastness and heat resistance. The cured film formed using the polymerizable composition can be used, for example, in various applications such as a retardation plate which is a constitutional element of an optical element, a polarizing element, a selective reflection film, a color filter, an antireflection film, a view angle compensation film, holography, and an alignment film.

The polymerizable composition may include one or more polymerizable liquid crystal compounds represented by Formula (I). For example, it is preferable to include the polymerizable liquid crystal compound represented by Formula (I-21) and polymerizable liquid crystal compound represented by Formula (I-31), one by one.

The total amount of the polymerizable liquid crystal compound represented by Formula (I) in the polymerizable composition may be 10 mass % or greater, preferably 30 to 99.9 mass %, more preferably 50 to 99.5 mass %, and even more preferably 70 to 99 mass % with respect to the solid content mass of the polymerizable composition.

[Urethane (Meth)Acrylate Monomer]

The urethane (meth)acrylate monomer includes a urethane bond represented by Formula (II) and three or more (meth)acryloyl groups.

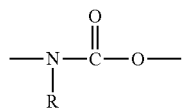

(II)

In Formula (II), R represents a hydrogen atom or a hydrocarbon group.

In the present specification, the "hydrocarbon group" means a monovalent group composed only of a carbon atom and a hydrogen atom, and examples thereof include an aromatic ring group such as an alkyl group, a cycloalkyl group, a phenyl group, and a naphthyl group.

R is preferably a hydrogen atom.

The urethane (meth)acrylate monomer is a compound obtained by the addition reaction using a polyisocyanate compound and a hydroxyl group-containing (meth)acrylate compound or the addition reaction using a polyalcohol compound and an isocyanate group-containing (meth)acrylate compound.

The urethane (meth)acrylate monomer does not generally have an isocyanate group.

The polyisocyanate compound is preferably diisocyanate or triisocyanate. Specific examples of the polyisocyanate compound include toluene diisocyanate, isophorone diisocyanate, hexamethylene diisocyanate, tolylene diisocyanate, and 1,3-bis(isocyanatomethyl) cyclohexane.

Examples of the hydroxyl group-containing (meth)acrylate compound include pentaerythritol triacrylate, dipentaerythritol pentaacrylate, 2-hydroxyethyl acrylate, and 2-hydroxyethyl methacrylate.

Examples of polyalcohol compounds include ethylene glycol, propylene glycol, glycerin, pentaerythritol, dipentaerythritol, trimethylol ethane, and trimethylolpropane.

Examples of the isocyanate group-containing (meth)acrylate compound include 2-isocyanatoethyl acrylate and 2-isocyanatoethyl methacrylate.

The urethane (meth)acrylate monomer includes three or more (meth)acryloyl groups, preferably four or more (meth)acryloyl groups, and more preferably five or more (meth)acryloyl groups. An upper limit of the number of (meth)acryloyl groups in the urethane (meth)acrylate monomer is not particularly limited, but may be 30 or less, more preferably 20 or less, and even more preferably 18 or less.

The molecular weight of the urethane (meth)acrylate monomer is preferably 400 to 8,000 and more preferably 500 to 5,000.

As the urethane (meth)acrylate monomer, a commercially available product may be used. Examples of the commercially available product include U-2PPA, U-4HA, U-6LPA, U-10PA, UA-1100H, U-10HA, U-15HA, UA-53H, UA-33H, U-200PA, UA-160TM, UA-290TM, UA-4200, UA-4400, UA-122P, UA-7100, and UA-W2A manufactured by Shin-Nakamura Chemical Co., Ltd., UA-510H, AH-600, AT-600, U-306T, UA-3061, UA-306H, UF-8001G, and DAUA-167 manufactured by Kyoeisha Chemical Co., Ltd., and EBERCRYL 204, EBERCRYL 205, EBERCRYL 210, EBERCRYL 215, EBERCRYL 220, EBERCRYL 230, EBERCRYL 244, EBERCRYL 245, EBERCRYL 264, EBERCRYL 265, EBERCRYL 270, EBERCRYL 280/151B, EBERCRYL 284, EBERCRYL 285, EBERCRYL 294/25HD, EBERCRYL 1259, EBERCRYL 1290, EBERCRYL 8200, EBERCRYL 8200AE, EBERCRYL 4820, EBERCRYL 4858, EBERCRYL 5129, EBERCRYL 8210, EBERCRYL 8254, EBERCRYL 8301R, EBERCRYL 8307, EBERCRYL 8402, EBERCRYL 8405, EBERCRYL 8411, EBERCRYL 8465, EBERCRYL 8800, EBERCRYL 8804, EBERCRYL 8807, EBERCRYL 9260, EBERCRYL 9270, KRM7735, KRM8296, KRM8452, KRM8904, EBERCRYL 8311, EBERCRYL 8701, EBERCRYL 9227EA, KRM8667, and KRM8528 manufactured by Daicell Allnex Ltd.

The urethane (meth)acrylate monomer is preferably 1 to 10 mass % and more preferably 1.5 to 5 mass % with respect to a total mass of the polymerizable liquid crystal compound represented by Formula (I) in the polymerizable composition.

The content of the urethane (meth)acrylate monomer is preferably 1 mass % to 10 mass % and more preferably 1.5 mass % to 7.5 mass % with respect to a total mass (solid content) of the polymerizable composition. In a case where the content of the urethane (meth)acrylate monomer is 1 mass % or greater, the effect of improving the crosslink density is higher. In a case where the content thereof is 10 mass % or less, the stability of the cholesteric liquid crystal layer is higher.

[Post-Addition of Urethane (Meth)Acrylate Monomer]

The urethane (meth)acrylate monomer is preferably post-added to a polymerizable composition (that may not include a urethane (meth)acrylate monomer) including the polymerizable liquid crystal compound Formula (I) which has a film shape or a layer shape. The polymerizable composition (hereinafter, referred to as a "polymerizable composition layer") including the polymerizable liquid crystal compound represented by Formula (I) which has a film shape or a layer shape preferably does not include a solvent, and may be a polymerizable composition before curing as described below and may be a polymerizable composition after curing.

In a case of a polymerizable composition after curing, it is preferable to further include a curing step such as photoirradiation.

Examples of the method of the post-addition includes means for immersing a polymerizable composition layer in a solution of a urethane (meth)acrylate monomer or means for coating a polymerizable composition layer with a solution of a urethane (meth)acrylate monomer and causing the solution to permeate the polymerizable composition layer. Examples thereof also include a method of adding urethane (meth)acrylate monomer to a coating solution of the layer in a case where the polymerizable composition layer is coated with another layer and immersing the polymerizable composition layer.

[Other Liquid Crystal Compounds]

The polymerizable composition may contain one or more different liquid crystal compounds together with the polymerizable liquid crystal compound represented by Formula (I). The polymerizable liquid crystal compound represented by Formula (I) has high compatibility with other liquid crystal compounds, and thus it is possible to form a film with high transparency without causing opaqueness or the like even in a case where other liquid crystal compounds are mixed. Since other liquid crystal compounds are used together, it is possible to provide compositions in various compositions which are suitable for various applications. Examples of other liquid crystal compounds that can be used in combination include rod-like nematic liquid crystal compounds. Examples of the rod-like nematic liquid crystal compound include azomethines, azoxys, cyanobiphenyls, cyanophenyl esters, benzoic acid esters, phenyl cyclohexane carboxylic acid esters, cyanophenyl cyclohexanes, cyano-substituted phenyl pyrimidines, alkoxy-substituted phenyl pyrimidines, phenyl dioxanes, tolanes, and alkenyl cyclohexyl benzonitriles. It is possible to use not only low molecular weight liquid crystal compounds as described above but also high molecular weight liquid crystal compounds.

The other liquid crystal compounds may be polymerizable or non-polymerizable. The rod-like liquid crystal compounds not having a polymerizable group are disclosed in various documents (for example, Y. Goto et. al., Mol. Cryst. Liq. Cryst. 1995, Vol. 260, pp. 23 to 28).

The polymerizable rod-like liquid crystal compound can be obtained by introducing the polymerizable group to the rod-like liquid crystal compound. Examples of the polymerizable group include an unsaturated polymerizable group, an epoxy group, an oxetanyl group, and an aziridinyl group, an unsaturated polymerizable group is preferable, and an ethylenically unsaturated polymerizable group is particularly preferable. The polymerizable group is introduced to a molecule of a rod-like liquid crystal compound in various methods. The number of polymerizable groups included in the polymerizable rod-like liquid crystal compound is preferably 1 to 6 and more preferably 1 to 3. Examples of the polymerizable rod-like liquid crystal compound include compounds disclosed in Makromol. Chem., Vol. 190, page 2255 (1989), Advanced Materials Vol. 5, page 107 (1993), U.S. Pat. Nos. 4,683,327A, 5,622,648A, 5,770,107A, WO95/22586A, WO95/24455A, WO97/00600A, WO98/23580A, WO98/52905A, JP1989-272551 (JP-H01-272551A), JP1994-16616A (JP-H06-16616A), JP1995-110469A (JP-H07-110469A), JP1999-80081A (JP-H11-80081A), and JP2001-328973A. Two or more kinds of polymerizable rod-like liquid crystal compounds may be used together. In a case where two or more kinds of polymerizable rod-like liquid crystal compounds are used, the alignment temperature can be decreased.

The addition amount of the liquid crystal compound is not particularly limited, and is preferably 0 to 70 mass %, more preferably 0 to 50 mass %, and even more preferably 0 to 30 mass % with respect to a solid content mass of the polymerizable composition. However, the range thereof is not limited thereto. In the polymerizable composition, a mass ratio (a mass of the polymerizable liquid crystal compound represented by Formula (I)/a mass of other liquid crystal compounds) between the polymerizable liquid crystal compound represented by Formula (I) and other liquid crystal compounds may be 100/0 to 30/70, preferably 100/0 to 50/50, and more preferably 100/0 to 70/30. The ratio can be adjusted in a preferable range.

[Chiral Compound]

The polymerizable composition may include a chiral compound. In a case where the chiral compound is used, the polymerizable composition can be prepared as a composition exhibiting a cholesteric liquid crystalline phase. The chiral compound may have liquid crystallinity or may have non-liquid crystallinity. The chiral compound can be selected from various well-known chiral agents (for example, chiral agents, isosorbide derivatives, isomannide derivatives, and binaphthyl derivatives disclosed in Liquid Crystal Device Handbook, Chapter 3, Sections. 4 to 3, Chiral agent for TN and STN, page 199, Japan Society for the Promotion of Science edited by the 142nd committee in 1989).

In general, the chiral compound includes an asymmetric carbon atom, but an axial asymmetric compound or a planar asymmetric compound which does not include the asymmetric carbon atom can be used. In an example of the axial asymmetric compound or the planar asymmetric compound, binaphthyl, helicene, paracyclophane, and a derivative thereof are included. The chiral compound (chiral agent) may have a polymerizable group. In a case where the chiral compound has a polymerizable group and the rod-like liquid crystal compound used together also has a polymerizable group, a polymer having a repeating unit derived from the rod-like liquid crystal compound and a repeating unit derived from the chiral compound can be formed by a polymerization reaction between the polymerizable chiral compound and the polymerizable rod-like liquid crystal compound. Therefore, the polymerizable group included in the polymerizable chiral compound is preferably a group which is the same as a polymerizable rod-like liquid crystal compound, particularly a polymerizable group included in the polymerizable liquid crystal compound represented by Formula (I). Accordingly, the polymerizable group of the chiral compound is also preferably an unsaturated polymerizable group, an epoxy group, an oxetanyl group, or an aziridinyl group, is more preferably a polymerizable group selected from the group consisting of groups represented by Formulae Q-1 to Q-5 and more preferably an acryloyl group (Formula Q-1) or a methacryloyl group (Formula Q-2).

In the polymerizable composition, the chiral compound is preferably 0.5 to 30 mass % with respect to a liquid crystal compound including the polymerizable liquid crystal compound represented by Formula (I). The use amount of the chiral compound is preferably smaller since as the use amount is smaller, an influence on liquid crystallinity is smaller. As a chiral compound, a compound having a strong twisting power such that twisted alignment with a desired spiral pitch can be achieved even in a small amount is preferable. In the same manner, examples of the chiral agent exhibiting strong twisting power include chiral agents disclosed in JP2003-287623A. Examples thereof include chiral agents disclosed in JP2002-302487A, JP2002-80478A, JP2002-80851A, JP2014-034581A, or LC-756 manufactured by BASF SE, and the like.

A film formed by causing a polymerizable composition in an aspect of containing a chiral compound to have a cholesteric liquid crystalline phase and fixing the polymerizable composition exhibits selective reflection characteristics with respect to light of a predetermined wavelength depending on its helical pitch, and is useful as a reflection film (for example, a visible light reflection film or an infrared reflection film). In a case where the polymerizable liquid crystal compound represented by Formula (I) exhibiting low birefringence is used, there is an advantage in that a reflection wavelength range becomes narrower compared with a film having the same thickness using a liquid crystal compound having higher birefringence and thus selectivity increases.

[Polymerization Initiator]

It is preferable that the polymerizable composition contains a polymerization initiator. For example, in an aspect of proceeding curing reaction by irradiation with ultraviolet rays and forming a cured film, it is preferable that a polymerization initiator to be used is a photopolymerization initiator that can start polymerization reaction due to irradiation with ultraviolet rays. Examples of the photopolymerization initiator include an α-carbonyl compound (disclosed in U.S. Pat. Nos. 2,367,661A and 2,367,670A), acyloin ether (disclosed in U.S. Pat. No. 2,448,828A), an α-hydrocarbon-substituted aromatic acyloin compound (disclosed in U.S. Pat. No. 2,722,512A), a polynuclear quinone compound (disclosed in U.S. Pat. Nos. 3,046,127A and 2,951,758A), a combination of triarylimidazole dimer and p-aminophenylketone (disclosed in U.S. Pat. No. 3,549,367A), an acridine and phenazine compound (disclosed in JP1985-105667A (JP-S60-105667A) and U.S. Pat. No. 4,239,850A), an acylphosphine oxide compound (disclosed in JP1988-40799B (JP-S63-40799B), JP1993-29234B (JP-H05-29234B), JP1998-95788A (JP-H10-95788A), JP1998-29997A (JP-H10-29997A), JP2001-233842A, JP2000-80068A, JP2006-342166A, JP2013-114249A, JP2014-137466A, JP4223071B, JP2010-262028A, and JP2014-500852A), an oxime compound (disclosed in JP2000-66385A and JP4454067B), and an oxadiazole compound (disclosed in U.S. Pat. No. 4,212,970A). For example, disclosure in paragraphs 0500 to 0547 of JP2012-208494A is referred to.

As the polymerization initiator, it is preferable to use an acylphosphine oxide compound or an oxime compound.

As the acylphosphine oxide compound, for example, IRGACURE 819 (compound name: bis(2,4,6-trimethylbenzoyl)-phenylphosphine oxide) manufactured by BASF Japan Ltd., which is a commercially available product, can be used. As the oxime compound, commercially available products of IRGACURE OXE01 (manufactured by BASF SE), IRGACURE OXE02 (manufactured by BASF SE), TR-PBG-304 (manufactured by Changzhou Tronly New Electronic Materials Co., Ltd.), ADEKA ARKLS NCI-831 and ADEKA ARKLS NCI-930 (manufactured by Adeka Corporation), and ADEKA ARKLS NCI-831 (manufactured by Adeka Corporation) can be used.

The polymerization initiator may be used singly, and two or more thereof may be used in combination.

The photopolymerization initiator is included in the polymerizable composition preferably by 0.1 to 20 mass % and more preferably by 1 to 8 mass % with respect to the solid content mass of the polymerizable composition.

[Alignment Control Agent]

An alignment control agent that contributes to the stable or prompt forming of a liquid crystalline phase (for example, a cholesteric liquid crystalline phase) may be added to the polymerizable composition. Examples of the alignment control agent include a fluorine-containing (meth)acrylate-based polymer, a compound represented by Formulas (X1) to (X3) disclosed in WO2011/162291A, and a compound disclosed in paragraphs [0020] to [0031] of JP2013-47204A. Examples thereof may further include two or more kinds selected from these alignment control agents. These compounds can reduce or substantially horizontally align the tilt angle the molecules of the liquid crystal compound at the air interface of the layer. In the present specification, the expression "horizontal alignment" means that a longer axis of the liquid crystal molecule and a film plane are parallel to each other, but the longer axis and the film plane do not have to be strictly parallel, and means alignment in which a tilt angle formed with a horizontal plane is less than 20°. In a case where the liquid crystal compound is horizontally aligned near the air interface, orientation defects are hardly generated, and thus transparency in a visible light region increases. On the other hand, when the molecules of the liquid crystal compound are aligned at a large tilt angle, for example, in the case of forming a cholesteric liquid crystalline phase, since the helical axis deviates from the film plane normal line, the reflectivity decreases or a fingerprint pattern is generated, and this causes an increase in haze or diffraction, and thus alignment at a large tilt angle is not preferable.

Examples of the fluorine-containing (meth)acrylate-based polymer that can be used as an alignment control agent are disclosed in [0018] to [0043] of JP2007-272185A.

As the alignment control agent, a compound may be used singly or two or more kinds of compounds may be used in combination.

In the polymerizable composition, the content of the alignment control agent is preferably 0.01 to 10 mass %, more preferably 0.01 to 5 mass %, and particularly preferably 0.02 to 1 mass % with respect to the mass of the compound of Formula (I).

[Other Additives]

The polymerizable composition may contain one or more kinds of other additives such as an antioxidant, an ultraviolet absorbing agent, a sensitizing agent, a stabilizer, a plasticizer, a chain transfer agent, a polymerization inhibitor, an antifoaming agent, a leveling agent, a thickener, a flame retardant, a surface-active substance, a dispersing agent, a dye, and a color material such as a pigment.

<Film>

The polymerizable composition of the present invention is useful as materials of various optical films such as a retardation film and a reflection film, and various optical films can be formed by using the polymerizable composition of the present invention.

[Method of Manufacturing Film]

An example of the method of manufacturing an optical film is a manufacturing method at least including:

(i) coating a surface of a substrate or the like with a polymerizable composition and forming a state of a liquid crystalline phase (a nematic liquid crystalline phase, a cholesteric liquid crystalline phase, or the like), and (ii) proceeding curing reaction of a polymerizable composition, fixing the liquid crystalline phase, so as to form a cured film (liquid crystal layer).

The steps (i) and (ii) are repeated a plurality of times so as to produce a film obtained by laminating a plurality of the cured films. A film obtained by laminating a plurality of the cured films can be produced by bonding the plurality of cured films with an adhesive.

In the step (i), first, a substrate or a surface of an alignment film formed on the substrate is coated with a polymerizable composition. The polymerizable composition is preferably prepared by the coating solution obtained by dissolving and/or dispersing materials in the solvent. As a solvent used in the preparation of the coating solution, an organic solvent is preferably used. Examples of the organic solvent include amide (for example, N,N-dimethylformamide); sulfoxide (such as dimethylsulfoxide); a heterocyclic compound (for example, pyridine); hydrocarbon (for example, benzene and hexane); alkyl halide (for example, chloroform and dichloromethane); ester (for example, methyl acetate, butyl acetate, and propylene glycol monoethyl ether acetate); ketone (for example, acetone, methyl ethyl ketone, cyclohexanone, and cyclopentanone); ether (for example, tetrahydrofuran and 1,2-dimethoxyethane); and 1,4-butanediol diacetate. Among these, alkyl halide, esters, and ketone are particularly preferable. Two or more types of organic solvents may be used in combination.

The coating of the coating solution is able to be performed by various methods such as a wire bar coating method, an extrusion coating method, a direct gravure coating method, a reverse gravure coating method, and a die-coating method. The composition is ejected from a nozzle by using an ink jet device, and thus, a coating film can be formed.

Subsequently, the polymerizable composition that is applied to the surface and became a coating film is caused to be a state of a liquid crystalline phase such as a nematic liquid crystalline phase or a cholesteric liquid crystalline phase. For example, in an aspect in which the polymerizable composition is prepared as a coating solution containing a solvent, a state of the liquid crystalline phase can be obtained by drying the coating film and removing the solvent in some cases. In order to obtain the transition temperature to the liquid crystalline phase, the coating film may be heated, as desired. For example, first, the coating film is heated to a temperature of an isotropic phase, and then, is cooled to a transition temperature of a liquid crystalline phase, and thus, it is possible to stably obtain the state of the liquid crystalline phase. In view of manufacturing suitability or the like, the liquid crystalline phase transition temperature of the polymerizable composition is preferably in a range of 10° C. to 250° C. and is more preferably in a range of 10° C. to 150° C. In a case where the transition temperature of the liquid crystalline phase is lower than 10° C., a cooling step is necessary in order to decrease the temperature to a temperature range at which a liquid crystalline phase is exhibited. In a case where the transition temperature of the liquid crystalline phase is higher than 200° C., a high temperature is required in order to obtain an isotropic liquid state of which the temperature is higher than the temperature range at which the crystalline phase is exhibited, and thus there have disadvantages such as waste of thermal energy, distortion or modification of a substrate, and the like.

Subsequently, in the step (ii), a coating film that became in a state of a liquid crystalline phase is cured. The curing may proceed by any polymerization method such as a radical polymerization method, an anionic polymerization method, a cationic polymerization method, and a coordination polymerization method. According to the polymerizable liquid crystal compound represented by Formula (I), a suitable polymerization method is selected. According to this polymerization, a polymer having a unit derived from the polymerizable liquid crystal compound represented by Formula (I) in a constitutional unit can be obtained.

For example, the curing reaction proceeds by irradiation with ultraviolet rays. For ultraviolet irradiation, a light source such as an ultraviolet lamp is used. In this step, the curing reaction of the composition proceeds by the irradiation with ultraviolet rays, and a liquid crystalline phase (a nematic liquid crystalline phase, a cholesteric liquid crystalline phase, and the like) is fixed, so as to form a cured film (liquid crystal layer).

There is no particular limitation on the irradiation energy amount of ultraviolet rays, but is preferably about 0.1 J/cm$^2$ to 0.8 J/cm$^2$ generally. The time for irradiating the coating film with ultraviolet rays is not particularly limited, but may be determined in view of both sufficient strength and productivity of the cured film.

In order to promote curing reaction, ultraviolet irradiation under the heating condition may be performed. The temperature during ultraviolet irradiation is preferably maintained in the temperature range that exhibits the liquid crystalline phase such that the liquid crystalline phase is not collapsed. An oxygen concentration in the atmosphere is involved in a degree of polymerization, and does not reach a desired degree of polymerization in the air, and in a case where film hardness is insufficient, it is preferable to decrease the oxygen concentration in the atmosphere by a method such as nitrogen substitution.

In the above step, the liquid crystalline phase is fixed, so as to form a cured film. Here, with respect to a state in which the liquid crystalline phase is "fixed", an aspect in which the alignment of the compound which is in the liquid crystalline phase is maintained is the most typical and preferable aspect. The state is not limited thereto and specifically indicates a state in which the fixed alignment shape can be stably and continuously maintained without fluidity in a layer or without a change in the shape of the alignment due to an external field or an external force, in a temperature range of generally 0° C. to 50° C. and in a temperature range of −30° C. to 70° C. under more rigorous conditions. According to the present invention, it is preferable that the alignment state of the liquid crystalline phase is fixed by the curing reaction performed by irradiation with ultraviolet rays.

The thickness of the cured film is not particularly limited. According to the application or according to desired optical characteristics, a preferable film thickness may be determined. Generally, the thickness is preferably 0.05 to 50 μm and more preferably 1 to 35 μm.

[Film Including Layer Obtained by Curing Composition Including Urethane (Meth)Acrylate Monomer]

As described above, the polymerizable composition including the polymerizable liquid crystal compound represented by Formula (I) may not include a urethane (meth) acrylate monomer before coating or before curing. In a case where the polymerizable composition layer is coated with another layer, a urethane (meth)acrylate monomer may be added to a coating solution of the layer. According to this step, a urethane (meth)acrylate monomer from another layer is immersed in a polymerizable composition, and then this layer is cured, so as to obtain an effect of improving the durability of the film, as a result. That is, it is preferable that the film is manufactured in the following order.

(1) Obtaining a film (polymerizable composition layer) formed from the polymerizable composition including the polymerizable liquid crystal compound, (2) coating the surface of the film with the composition containing the urethane (meth)acrylate monomer, and (3) proceeding the curing reaction of the laminate obtained after coating.

The polymerizable composition layer may be a film obtained by drying the coating film of the polymerizable composition including the polymerizable liquid crystal compound, and may be a film obtained by further curing the film, but the latter is preferable. This is because, in a case where the film is caused to be a cured film, even in a case where the (meth)acrylate monomer is immersed, it is hard to influence on the alignment of the liquid crystal layer. Even in a case where the film is cured, by the step of immersing the urethane (meth)acrylate monomer and proceeding the curing reaction thereafter, it is possible to form a crosslinking structure of the polymer that has been already formed.

With respect to the curing reaction of the laminate, the curing reaction of the polymerizable composition layer and the curing reaction of the composition containing the urethane (meth)acrylate monomer simultaneously proceed. The proceeding of the curing reaction is preferably performed by the irradiation with ultraviolet rays.

With respect to the film obtained in this manner, a layer obtained by curing a polymerizable composition including the polymerizable liquid crystal compound represented by Formula (I) and a layer obtained by curing a composition including a urethane (meth)acrylate monomer are adjacent to each other (preferably directly in contact with each other).

With respect to the obtained film, the layer obtained by curing the composition including the urethane (meth)acrylate monomer may function as a protective layer.

[Substrate]

The film may have a substrate. The substrate has self-supporting properties, as long as the substrate supports the above cured film, there is no limitation on materials and optical characteristics. The substrate can be selected from a glass plate, a quartz plate, a polymer film, or the like. Depending on the application, a substrate having high transparency to ultraviolet light may be used. Examples of the polymer film having high transmittance to visible light include polymer films for various optical films used as members of display devices such as liquid crystal display devices. Examples of the substrate include a polyester film such as polyethylene terephthalate (PET), polybutylene terephthalate, and polyethylene naphthalate (PEN); a polycarbonate (PC) film and a polymethyl methacrylate film; a polyolefin film such as polyethylene and polypropylene; and a polyimide film and a triacetyl cellulose (TAC) film. A polyethylene terephthalate film and a triacetyl cellulose film are preferable.

[Alignment Layer]

The film may have an alignment layer between the substrate and the cured film. The alignment layer has a function of more precisely defining the alignment direction of the liquid crystal compound. The alignment layer can be provided by means such as a rubbing treatment of an organic compound (preferably, a polymer), oblique vapor deposition of an inorganic compound, and formation of a layer having microgrooves. There is also known an alignment layer in which an orientation function is generated by application of an electric field, application of a magnetic field, or photoirradiation. It is preferable that the alignment layer is formed by performing a rubbing treatment on the surface of the polymer film.

As the material used in the alignment layer, a polymer of an organic compound is preferable, and a polymer which is crosslinked by itself or a polymer which is crosslinked by a crosslinking agent is frequently used. Naturally, polymers having both functions are used. Examples of the polymer include polymers such as polymethyl methacrylate, an acrylic acid/methacrylic acid copolymer, a styrene/maleinimide copolymer, polyvinyl alcohol and modified polyvinyl alcohol, poly(N-methylolacrylamide), a styrene/vinyltoluene copolymer, chlorosulfonated polyethylene, nitrocellulose, polyvinyl chloride, chlorinated polyolefin, polyester, polyimide, a vinyl acetate/vinyl chloride copolymer, an ethylene/vinyl acetate copolymer, carboxymethyl cellulose, gelatin, polyethylene, polypropylene, and polycarbonate, and a compound such as a silane coupling agent. Examples of preferred polymers include a water-soluble polymer such as poly(N-methylolacrylamide), carboxymethyl cellulose, gelatin, polyvinyl alcohol, and modified polyvinyl alcohol. Among these, gelatin, polyvinyl alcohol, and modified polyvinyl alcohol are preferable, and polyvinyl alcohol and modified polyvinyl alcohol are particularly preferable.

[Adhesive Layer]

In a case where a plurality of cured films are bonded to each other with an adhesive, an adhesive layer is provided between the cured films. The adhesive layer may be formed of an adhesive agent.

In view of a curing method, examples of the adhesive include a hot melt type, a thermosetting type, a photocuring type, a reaction curing type, and a pressure-sensitive adhesive type unnecessary for curing. As the materials, acrylate-based, urethane-based, urethane acrylate-based, epoxy-based, epoxy acrylate-based, polyolefin-based, modified olefin-based, polypropylene-based, ethylene vinyl alcohol-based, vinyl chloride-based, chloroprene rubber-based, cyanoacrylate-based, polyamide-based, polyimide-based, polystyrene-based, and polyvinyl butyral-based compounds, and the like can be used. In view of workability and productivity, a photocuring type is preferable as a curing method. In view of optical transparency and heat resistance, as the material, acrylate-based, urethane acrylate-based, epoxy acrylate-based compounds are preferably used.

The thickness of the adhesive layer may be 0.5 to 10 μm and preferably 1 to 5 μm. In a case where the film is used as a half mirror for a projection image display, it is preferable that the adhesive layer is provided to have a uniform film thickness in order to reduce color unevenness or the like.

[Application of Film]

Examples the film formed by using the polymerizable composition include a film in which the alignment of the liquid crystalline phase (for example, horizontal alignment, vertical alignment, and hybrid alignment) of the polymerizable composition is fixed. This film generally exhibits optical anisotropy and is used as an optical compensation film for a liquid crystal display device and the like.

Other examples thereof include a film including a layer in which the cholesteric liquid crystalline phase of the polymerizable composition is fixed and which exhibits selective reflection characteristics with respect to light in a predetermined wavelength range.

In the cholesteric liquid crystalline phase, liquid crystal molecules are arranged in a spiral pattern. A layer in which the cholesteric liquid crystalline phase is fixed (hereinafter, also referred to as a "cholesteric liquid crystal layer") selectively reflects any one of right-handed circular polarization and left-handed circular polarization in the selective reflection wavelength range and functions as a circular polarization selective reflection layer that transmits circular polarization of the other sense. A film containing one or more cholesteric liquid crystal layers can be used for various purposes. In a film including two or more cholesteric liquid crystal layers, the sense of circular polarization reflected by each cholesteric liquid crystal layer may be the same or reverse depending on the application. The central wavelength of selective reflection of each cholesteric liquid crystal layer described below may be identical to or different from each other according to the application.

In the present specification, the expression "sense" for circular polarization means right-handed circular polarization and left-handed circular polarization. With respect to the sense of the circular polarization light, in a case where light proceeds forward, a case where a tip of an electric field vector rotates in a clockwise direction according to the time elapse is defined as right circular polarization light, and a case where a tip of an electric field vector rotates in a counterclockwise direction is defined as left circular polarization light. In the present specification, the expression "sense" may be used for the twisted direction of the helix of the cholesteric liquid crystal. In a case where the twisted direction (sense) of the helix of the cholesteric liquid crystal is right, right-handed circular polarization is reflected and left-handed circular polarization is transmitted. In a case where the sense is left, left-handed circular polarization is reflected and right-handed circular polarization is transmitted.

For example, a film including a cholesteric liquid crystal layer exhibiting selective reflection characteristics in the visible light wavelength range (wavelength 400 to 750 nm) can be used as a screen or a half mirror for projection image display. The film can be used as a filter that improves color purity of display light of a color filter or a display (for example, see JP2003-294948A) by controlling the reflection band.

The optical film can be used for various applications such as a polarizing element, a reflection film, an antireflection film, a viewing angle compensation film, holography, and an alignment film, as a constitutional element of the optical element.

Hereinafter, the application as a member for projection image display which is a particularly preferable application is described.

[Member for Projection Image Display]

By the above function of the cholesteric liquid crystal layer, a projection image can be formed by reflecting circular polarization in any one of senses at a wavelength exhibiting selective reflection among projection light. The projection image is displayed on the surface of the member for projection image display and may be visually recognized in that manner or may be a virtual image which appears to float above the member for projection image display as viewed from the observer.

A central wavelength λ of the selective reflection depends on a pitch P (=helical cycle) in a helical structure in the cholesteric phase and follows a relationship of λ=n×P with an average refractive index n of the cholesteric liquid crystal layer. Here, the central wavelength λ of the selective reflection of the cholesteric liquid crystal layer means the wavelength at the center position of the reflection peak of the circular polarization reflection spectrum measured from the normal direction of the cholesteric liquid crystal layer. As can be seen from the above equation, the central wavelength of the selective reflection can be adjusted by adjusting the pitch of the helical structure. That is, for example, in order to selectively reflect any one of the right-handed circular polarization and the left-handed circular polarization with respect to the blue light by adjusting the n value and the P value, it is possible to adjust the central wavelength k such that the apparent central wavelength of selective reflection is in the wavelength range of 450 nm to 495 nm. Incidentally, the apparent central wavelength of selective reflection means the wavelength at the center position of the reflection peak of the circular polarization reflection spectrum of the cholesteric liquid crystal layer measured from the observation direction in practical use (in a case of being used as a member for projection image display). The pitch in the cholesteric liquid crystalline phase depends on types of a chiral agent used together with the polymerizable liquid crystal compound or addition concentration thereof. Therefore, a desired pitch can be obtained by adjusting these. With respect to the sense of a helix or a measuring method of the pitch, methods disclosed in page 46 of "Easy Steps in Liquid Crystal Chemistry Experiment" edited by The Japanese Liquid Crystal Society, Sigma Publishing, published in 2007 and page 196 of "Liquid Crystal Handbook" Editorial Committee of Liquid Crystal Handbook, Maruzen can be used in the same manner.

With respect to a half-width $\Delta\lambda$ (nm) of the selective reflection wavelength range exhibiting the circular polarization selective reflection, $\Delta\lambda$ depends on birefringence $\Delta n$ of the liquid crystal compound and the pitch P and follows a relationship of $\Delta\lambda = \Delta n \times P$. Therefore, control of the width of the selective reflection wavelength range can be performed by adjusting $\Delta n$. That is, in the cholesteric liquid crystal layer formed from a composition containing a low birefringence polymerizable liquid crystal compound of the present invention, wavelength selectivity of selective reflection can be enhanced.

For example, $\Delta\lambda/\lambda$, which is the ratio of the half-width $\Delta\lambda$ of the selective reflection wavelength range to the central wavelength $\lambda$ of the selective reflection, can be used as an index exhibiting the wavelength selectivity of the selective reflection. $\Delta\lambda/\lambda$ of the film of the present invention, particularly a film used as a member for projection image display, is preferably 0.09 or less and more preferably 0.07 or less. More specifically, in the cholesteric liquid crystal layer in the film, it is preferable that $\Delta\lambda/\lambda$ satisfies the above condition, and with respect to the film including two or more cholesteric liquid crystal layers, it is preferable that $\Delta\lambda/\lambda$ in each of two or more cholesteric liquid crystal layers satisfies the above condition. $\Delta\lambda$ and $\lambda$ of each layer may be identical to or different from each other.

By using the above polymerizable composition, cured films having apparent central wavelengths of selective reflection respectively in a red light wavelength range, a green light wavelength range, and a blue light wavelength range were prepared respectively and were laminated, so as to produce the member for projection image display that can display a full color projection image. Specifically, it is preferable to laminate the cured films having in which the half mirrors are in the respective ranges of 750 to 620 nm, 630 to 500 nm, and 530 to 420 nm and which have different central wavelengths of selective reflection (for example, the difference is 50 nm or greater).

The central wavelength of the selective reflection of each cured film is adjusted according to the emission wavelength range of the light source used for projection and the mode of use of the member for projection image display, so as to display clear projection images with high efficiency of light utilization. Particularly, the central wavelength of the selective reflection of each cured film is adjusted according to the emission wavelength range of the light source used for projection and the like, so as to display clear projection images with high efficiency of light utilization. Examples of the aspect of the use of the member for projection image display particularly include the incidence angle of the projection light on the surface of the half mirror for projection image display and the projection image observation direction of the surface of the member for projection image display.

For example, by configuring the member for projection image display so as to have transmittance to light in the visible light region, the half mirror that can be used as a combiner of the head up display can be formed. The half-mirror for projection image display can display the image projected from a projector or the like in a viewable manner, and in a case where the half-mirror for projection image display is observed, it is possible to simultaneously observe information or landscape on the face side from the same face side on which the image is displayed.

In a case where the film is used as a half-mirror for projection image display, it is preferable to provide a cured film produced as described above, particularly, a laminate of three or more cured films on the surface of the base material. It is preferable that the base material is transparent in the visible light region and has low birefringence. For example, the retardation of the base material at the wavelength of 550 nm is preferably 50 nm or less and more preferably 20 nm or less.

Examples of the base material include inorganic glass and a polymer resin (an acrylic resin (acrylic acid esters such as polymethyl (meth)acrylate), polycarbonate, cyclic polyolefin such as cyclopentadiene-based polyolefin and norbornene-based polyolefin, polyolefins such as polypropylene, aromatic vinyl polymers such as polystyrene, polyarylate, cellulose acylate, and the like). Among these, in view of low birefringence, inorganic glass, an acrylic resin, cyclic polyolefin, polyolefins, and cellulose acylate are preferable, and inorganic glass and an acrylic resin are more preferable.

The half-mirror for projection image display may have an antireflection layer. The antireflection layer is preferably included in the outermost surface. In a case of using the half-mirror for projection image display, the antireflection layer may be provided on an outermost surface that becomes a viewing side, or may be provided on the outermost surface on the opposite side. However, it is preferable that the antireflection layer is provided on the outermost surface on the viewing side. In a case where the cured film is provided on the base material surface, an antireflection layer may be provided on both the base material side surface and the cured film side which becomes the viewing side. With such a configuration, it is difficult to generate a double image that may occur particularly in a case where the birefringence of the base material is high.

In addition to a film on which fine surface unevenness is formed, examples of the antireflection layer include films having a configuration of a two-layer film obtained by combining a layer of a high refractive index and a layer of a low refractive index and a configuration of a three-layer film obtained by sequentially laminating a layer of a medium refractive index, a layer of a high refractive index, and a layer of a low refractive index.

Examples of the configuration example include a film in which two layers of a layer of a high refractive index and a layer of a low refractive index in an order from the lower side, or a film in which three layers having different refractive indexes are stacked, in order of a layer of a medium refractive index (a layer having a higher refractive index than the underlayer and a lower refractive index than the layer of a high refractive index), a layer of a high refractive index, and a layer of a low refractive index. It is also suggested to laminate more antireflection layers. Among these, in view of durability, optical characteristics, cost, productivity, and the like, it is preferable to include a layer of a medium refractive index, a layer of a high refractive index, and a layer of a low refractive index in this order on the hard coat layer, and examples thereof include configurations disclosed in JP1996-122504A (JP-H08-122504A), JP1996-110401A (JP-H08-110401A), JP1998-300902A (JP-H10-300902A), JP2002-243906A, and JP2000-111706A. An antireflection film having a three-layer configuration excellent in robustness against film thickness fluctuation is disclosed in JP2008-262187A. The antireflection film having a three-layer configuration is provided on the surface of the image display device, the average value of the reflectivity may be caused to be 0.5% or less, and the reflected glare can be remarkably reduced. Therefore, an image having an excellent stereoscopic effect can be obtained. It is possible to impart other functions to each layer, and examples thereof include an antifouling layer of a low refractive index, an antistatic layer of a high refractive index, an antistatic hard coat layer, and an antiglare hard coat layer (for example, JP1998-206603A (JP-H10-206603A), JP2002-243906A, and JP2007-264113A).

Examples of the inorganic material forming the antireflection layer include $SiO_2$, $SiO$, $ZrO_2$, $TiO_2$, $TiO$, $Ti_2O_3$, $Ti_2O_5$, $Al_2O_3$, $Ta_2O_5$, $CeO_2$, $MgO$, $Y_2O_3$, $SnO_2$, $MgF_2$, and $WO_3$, and these may be used singly or two or more kinds thereof may be used in combination. Among these, $SiO_2$, $ZrO_2$, $TiO_2$, and $Ta_2O_5$ are preferable, since vacuum deposition is possible at low temperature and it is possible to form films also on the surface of a plastic substrate.

As a multilayer film formed of an inorganic material, a lamination structure in which a total optical thickness of the $ZrO_2$ layer and the $SiO_2$ layer from the substrate side is $\lambda/4$, an optical thickness of the $ZrO_2$ layer is $\lambda/4$, an optical thickness of the $SiO_2$ layer of the outermost layer is $\lambda/4$, and the layers of a high refractive index and the layers of a low refractive index are alternately formed is exemplified. Here, $\lambda$ is the design wavelength, 520 nm is usually used. The outermost layer is preferably formed of $SiO_2$ in which a refractive index is low and mechanical strength can be imparted to the antireflection layer.

In a case where an antireflection layer is formed of an inorganic material, as a film formation method, for example, a vacuum deposition method, an ion plating method, a sputtering method, a CVD method, and a method of precipitating by chemical reaction in a saturated solution, or the like can be employed.

Examples of the organic material used for the layer of the low refractive index include a tetrafluoroethylene-hexafluoropropylene copolymer (FFP), polytetrafluoroethylene (PTFE), and an ethylene-tetrafluoroethylene copolymer (ETFE). A composition containing a fluorine-containing curable resin and inorganic fine particles disclosed in JP2007-298974A and a hollow silica fine particle-containing coating composition of a low refractive index disclosed in JP2002-317152A, JP2003-202406A, and JP2003-292831A are suitably used. As a film formation method, in addition to the vacuum deposition method, a film can be formed by a coating method excellent in mass productivity such as a spin coating method, a dip coating method, and a gravure coating method.

The refractive index of the layer of a low refractive index is preferably 1.30 to 1.51, more preferably 1.30 to 1.46, and even more preferably 1.32 to 1.38.

Examples of the organic materials used in the layer of a medium refractive index and the layer of a high refractive index include a binder obtained by crosslinking or polymerization reaction such as an ionizing radiation curable compound containing an aromatic ring, a ionizing radiation curable compound including a halogenated element other than fluorine (for example, Br, I, and Cl), and an ionizing radiation curable compound containing atoms such as S, N, and P, and inorganic particles containing TiO$_2$ as a main component to be added thereto. Specifically, organic materials disclosed in paragraph numbers [0074] to [0094] of JP2008-262187A can be exemplified.

The refractive index of the layer of a high refractive index is preferably 1.65 to 2.20 and more preferably 1.70 to 1.80. The refractive index of the layer of a medium refractive index is adjusted so as to be a value between the refractive index of the layer of a low refractive index and the refractive index of the layer of a high refractive index. The refractive index of the layer of a medium refractive index is preferably 1.55 to 1.65 and more preferably 1.58 to 1.63.

The film thickness of the antireflection layer is not particularly limited, but may be 0.1 to 10 µm, 1 to 5 µm, and about 2 to 4 µm.

EXAMPLES

Hereinafter, characteristics of the present invention are more specifically described with reference to the examples and comparative examples. A material, an amount used, a treatment detail, a treatment order, and the like provided in the following examples can be suitably changed without departing from the gist of the present invention. The scope of the present invention should not be construed in a limited manner by the following specific examples.

In the examples, NMR means a nuclear magnetic resonance.

Synthesis Example

[Synthesis of Compound 1]

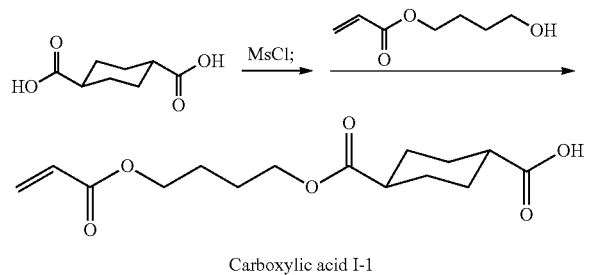

Carboxylic acid I-1

Trans-1,4-cyclohexadicarboxylic acid (10 g), mesyl chloride (1.9 mL), and BHT (0.2 g) were stirred in THF (72 mL), the internal temperature was maintained at 25° C. or lower, and triethylamine (3.7 mL) was added dropwise. After stirring at room temperature for two hours, N,N-dimethylaminopyridine (0.3 g) and 4-hydroxybutyl acrylate (3.1 g) were added, and triethylamine (3.7 mL) was added dropwise at an internal temperature of 25° C. or lower. After stirring at room temperature for three hours, diluted hydrochloric acid and ethyl acetate were added to remove the aqueous layer, and washing with diluted hydrochloric acid, saturated sodium bicarbonate water, and saline in this order was performed. The organic layer was dried over magnesium sulfate, the desiccant was filtered off, and the solvent was distilled off under reduced pressure to obtain carboxylic acid I-1 (7.1 g).

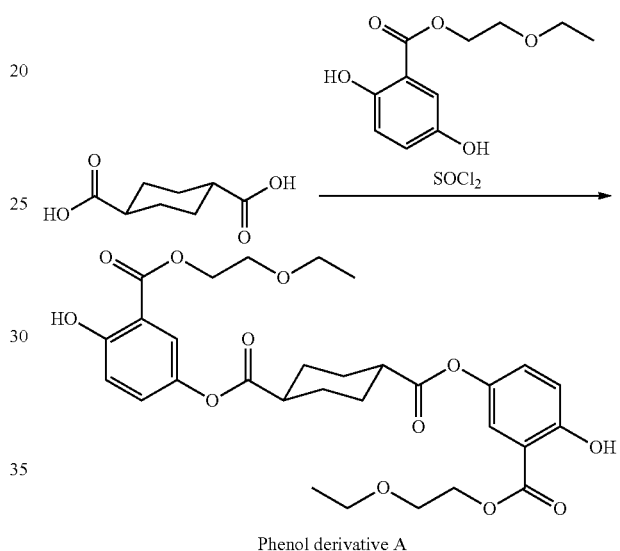

Phenol derivative A

A mixture of trans-1,4-cyclohexanedicarboxylic acid (5 g), toluene (40 mL), and N,N-dimethylformamide (0.05 mL) was heated with stirring and thionyl chloride (8.3 g) was added dropwise at an internal temperature of 80° C., and heating and stirring were performed for two hours at an internal temperature of 80° C. After cooling to an internal temperature of 30° C., 2-ethoxyethyl=2,5-dihydroxybenzoate (13.1 g) was added, heating and stirring at an internal temperature of 90° C. for four hours were performed. After methanol (60 mL) was added at an internal temperature of 40° C., the mixture was further stirred at an internal temperature of 5° C. for 30 minutes, and the produced crystals were filtered to obtain 11.5 g of a phenol derivative A.

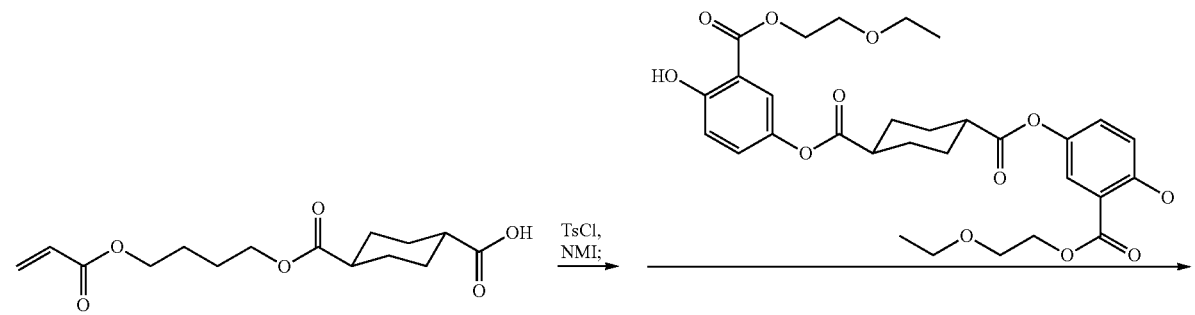

-continued

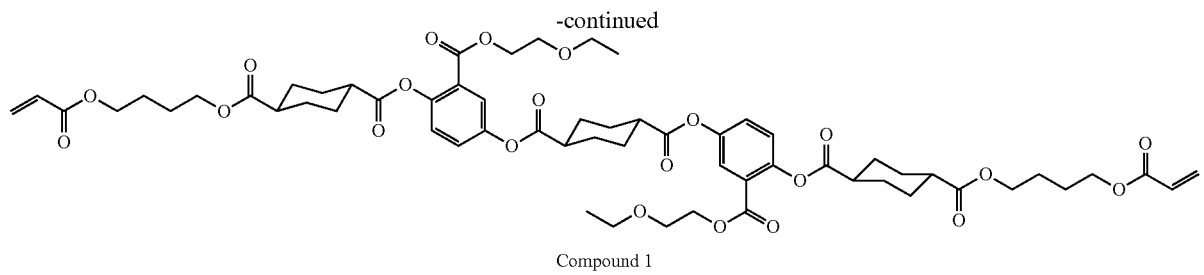

Compound 1

Carboxylic acid 1-9 (13.4 g), TsCl (10.3 g) and BHT (0.2 g) were stirred in THF (40 mL) and 1-ethyl 2-pyrrolidone (25 mL), 1-methyl imidazole (11 mL) was added dropwise under ice cooling, and stirring was performed for one hour at room temperature. The phenol derivative A (10.6 g) was added, and stirring was further performed at room temperature for two hours. After water (10 mL) was added, the aqueous layer was removed, water and methanol were added, stirring was performed for one hour under ice cooling, and the produced crystals were filtered to obtain Compound 1 (18.3 g).

$^1$H-NMR (Solvent:CDCl$_3$) δ(ppm):

1.2 (t, 6H), 1.4-1.8 (m, 18H), 2.1-2.2 (m, 4H), 2.2-2.4 (m, 12H), 2.5-2.7 (m, 4H), 3.5 (q, 4H), 3.7-3.8 (m, 4H), 4.1-4.3 (m, 8H), 4.4-4.5 (m, 4H), 5.8 (dd, 2H), 6.1 (dd, 2H), 6.4 (dd, 2H), 7.1 (d, 2H), 7.3 (dd, 2H), 7.7 (d, 2H)

<Synthesis of Compound 2>

4-(4-acryloyloxybutyloxy) benzoic acid was synthesized by referring to the method disclosed in [0085] to [0087] of page 18 of JP4397550B.

Dibutylhydroxytoluene (BHT, 0.1 g) was added to a solution of methanesulfonyl chloride (8.7 g), tetrahydrofuran (35 mL) and ethyl acetate (40 mL), and the internal temperature was cooled to −5° C. A separately prepared solution of 4-(4-acryloyloxybutyloxy) benzoic acid (19.6 g) and triethylamine (8.2 g) in tetrahydrofuran (31 mL) was added dropwise such that the internal temperature did not rise above 0° C. After stirring was performed at −5° C. for one hour, a small amount of N-methylimidazole was added, the compound 2A (19 g) was added, 3.5 mL of tetrahydrofuran was added, triethylamine (8.2 g) was added dropwise, and stirring was performed for two hours at room temperature. Water (42 mL) was added to stop the reaction, ethyl acetate was added to remove the aqueous layer, and washing was performed with the diluted hydrochloric acid and saline in this order. After a desiccant was added and filtration was

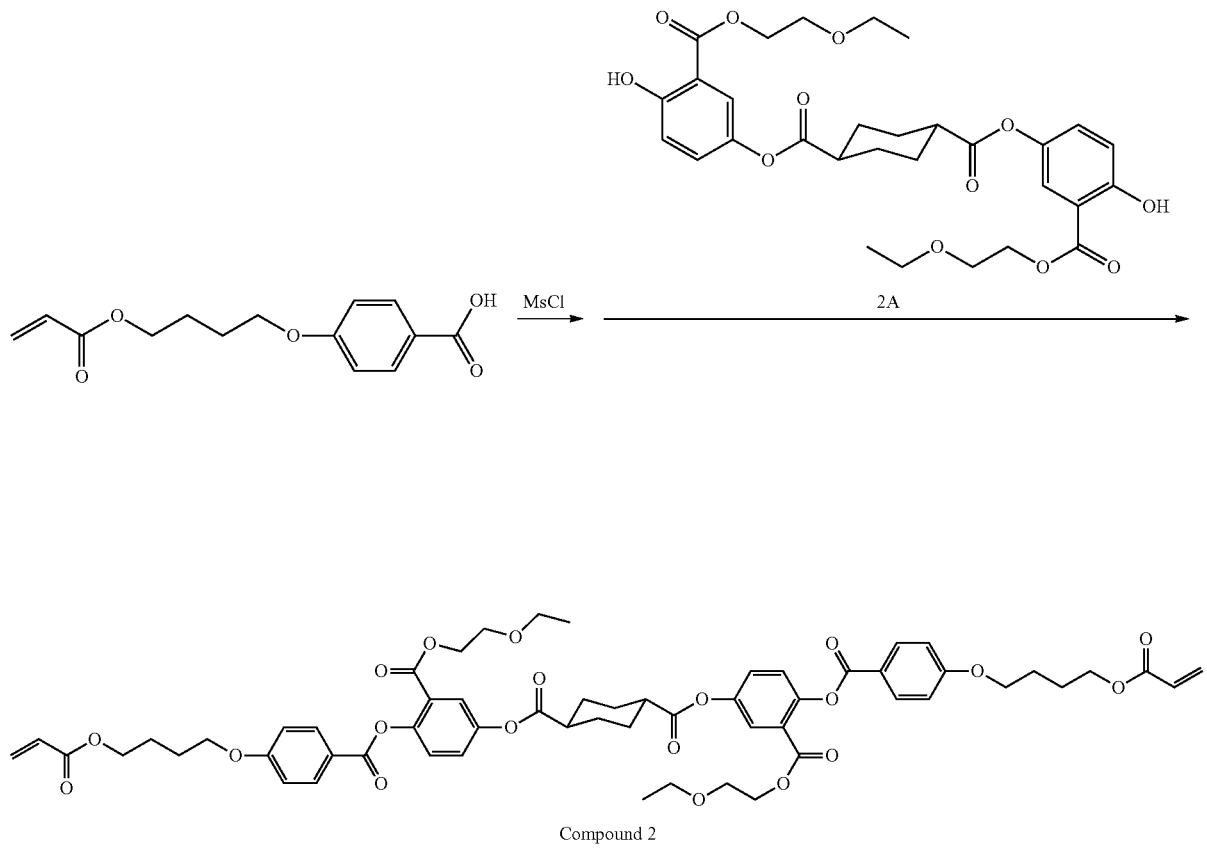

Compound 2 performed, methanol (100 mL) was added thereto, and the resulting crystals were filtered to obtain 25 g of a compound 2.

$^1$H-NMR (Solvent:CDCl$_3$) δ(ppm):
1.2 (t, 6H) 1.65-1.8 (m, 4H), 1.85-1.95 (m, 8H), 2.3-2.4 (m, 4H), 2.6-2.7 (m, 2H), 3.4 (q, 4H), 3. 5-3.6 (m, 4H), 4.1 (m, 4H), 4.15-4.25 (m, 8H), 5.85 (dd, 2H), 6.1 (dd, 2H), 6.4 (dd, 2H), 7.0 (d, 4H), 7.25 (d, 2H), 7.35 (dd, 2H), 7.8 (d, 2H), 8.15 (d, 4H)

Production of Films of Examples 1 to 11, Comparative Examples 1 to 4

[Preparation of Polymerizable Composition]

sition). This was dissolved in chloroform to obtain a dope solution having a solid content of 0.18 mass %. Spin-coating was performed on the alignment film surface of the glass substrate with the alignment film produced above with this dope solution at 800 rpm for 10 seconds. The glass substrate coated with the obtained dope solution was allowed to stand at 85° C. for 60 seconds and UV irradiation (Light source UV: EXECURE 3000-W, manufactured by Hoya Candeo Optronics Co., Ltd.) was performed at 70° C. under a nitrogen atmosphere (oxygen concentration: 500 ppm or less) by using a UV cut filter that cuts off light having a wavelength of 350 nm or less at 300 mJ/cm$^2$ to form a cholesteric liquid crystal layer having a film thickness of 4 µm.

(Polymerizable composition 1)

| | |
|---|---|
| Compound 1 | 52 parts by mass |
| Compound 2 | 28.5 parts by mass |
| Compound 3 | 14.2 parts by mass |
| Initiator IRGACURE OXE01 (manufactured by BASF SE) | 1 part by mass |
| Chiral agent LC-756 (manufactured by BASF SE) | 4.3 parts by mass |
| Air interface alignment agent A | 0.05 parts by mass |

Compound 3

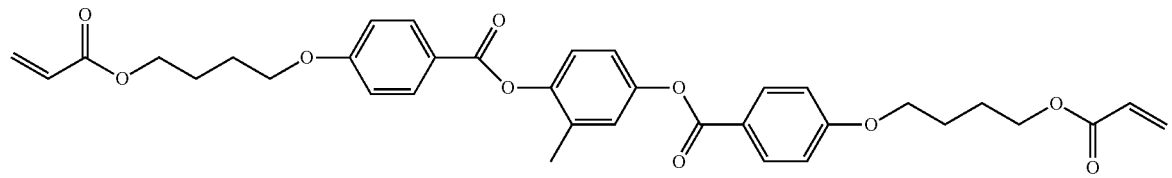 [SMILES: C=CC(=O)OCCCCOc1ccc(C(=O)Oc2ccc(OC(=O)c3ccc(OCCCCOC(=O)C=C)cc3)c(C)c2)cc1]

Air interface alignment agent A

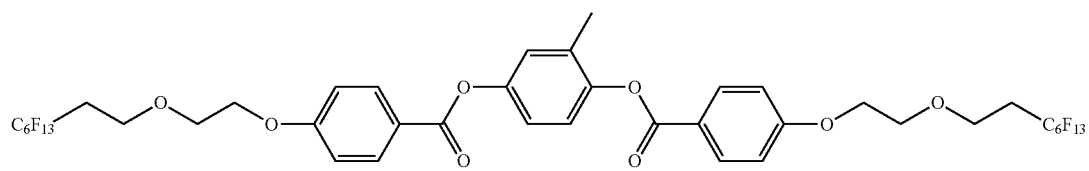

(Polymerizable composition 2)

| | |
|---|---|
| Compound 3 | 94.7 parts by mass |
| Initiator IRGACURE OXE01 (manufactured by BASF SE) | 1 part by mass |
| Chiral agent LC-756 (manufactured by BASF SE) | 4.3 parts by mass |
| Air interface alignment agent A | 0.05 parts by mass |

[Forming of Cholesteric Liquid Crystal Layer]

A 2% N-methyl-2-pyrrolidone solution of SE-130 (manufactured by Nissan Chemical Industries, Ltd.) was produced on the washed glass. Bar coating was performed on a glass substrate with this, and then the solution was dried in an oven at 100° C. for five minutes and then at 250° C. for 60 minutes. Thereafter, a rubbing treatment was performed at a rotation speed of 1,000 rpm to prepare a glass substrate with an alignment film.

Additives presented in the table were added to the polymerizable composition 1 or the polymerizable composition 2 in the amounts presented in the table (mass % of the additive with respect to the total mass of the polymerizable compo-

[Durability Evaluation]

A UV spectrum (Shimadzu UV-3100 PC UV-Visible Near Infrared Analytical Photometer, Measuring Wavelength: 700 to 500 nm, Slit width: 1 nm, transmittance measurement) of the obtained sample before and after a temperature and humidity resistance test as below was measured, the shift amount of the selective reflection wavelength was measured, so as to evaluate durability.

In the temperature and humidity resistance test, samples were put into a constant temperature and constant humidity chamber (PR-3ST, manufactured by Espec Corporation) at 85° C. and 85%, and left to stand for 97 hours. Results thereof are as presented in Table 1.

TABLE 1

|  | Example 1 | Example 2 | Example 3 | Example 5 | Example 6 | Example 7 | Example 8 |
|---|---|---|---|---|---|---|---|
| Liquid crystal composition | 1 | 1 | 1 | 1 | 1 | 1 | 1 |
| Additive | U-4HA | U-306T | U-306I | U-15HA | U-10HA | U-10PA | U-4HA |
| Addition amount (mass %) | 2 | 2 | 2 | 2 | 2 | 2 | 1 |
| Spectrum width at transmittance 70% (nm) (Before temperature and humidity resistance test) | 34 | 35 | 35 | 33 | 34 | 33 | 34 |
| Durability evaluation Shift amount of the selective reflection wavelength (nm) | 4 | 4 | 5 | 3 | 2 | 2 | 5 |

|  | Example 9 | Example 10 | Example 11 | Comparative Example 1 | Comparative Example 2 | Comparative Example 3 | Comparative Example 4 |
|---|---|---|---|---|---|---|---|
| Liquid crystal composition | 1 | 1 | 1 | 1 | 1 | 2 | 2 |
| Additive | U-4HA | U-4HA | U-4HA | None | Polymerizable monomer 1 | None | U-306T |
| Addition amount (mass %) | 5 | 7.5 | 9.5 | 0 | 2 | 0 | 2 |
| Spectrum width at transmittance 70% (nm) (Before temperature and humidity resistance test) | 35 | 35 | 35 | 35 | 35 | 58 | 57 |
| Durability evaluation Shift amount of the selective reflection wavelength (nm) | 4 | 5 | 6 | 8 | 8 | 4 | 4 |

In Table 1, the additives are as follows.

U-4HA: Urethane (meth)acrylate monomer manufactured by Shin-Nakamura Chemical Co., Ltd.

U-306T: Urethane (meth)acrylate monomer manufactured by Kyoeisha Chemical Co., Ltd.

U-15HA: Urethane (meth)acrylate monomer manufactured by Shin-Nakamura Chemical Co., Ltd.

Polymerizable monomer 1: VISCOAT #360 (manufactured by Osaka Organic Chemical Industry Ltd.)

Polymerizable Monomer 1

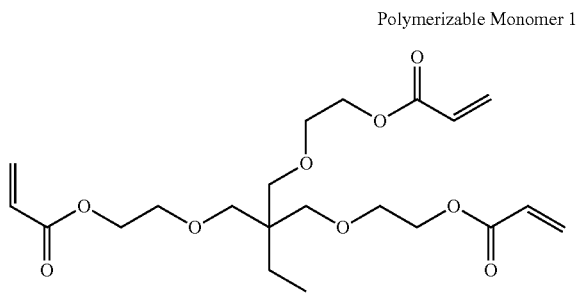 [SMILES: C=CC(=O)OCCOCC(CC)(COCCOC(=O)C=C)COCCOC(=O)C=C]

From the results presented in Table 1, in an example in which a urethane (meth)acrylate monomer was added to a composition (Polymerizable Composition 1) including a polymerizable liquid crystal compound including a saturated hydrocarbon ring group, it was understood that the shift amount of the selective reflection wavelength is reduced and the durability is improved. In an example of using a composition (Polymerizable Composition 2) of a polymerizable liquid crystal compound not including a saturated hydrocarbon ring group, a shift amount of the selective reflection wavelength did not change and the durability did not change depending on whether the urethane (meth)acrylate monomer was added or not. In an example of using a composition including a polymerizable liquid crystal compound including a saturated hydrocarbon ring group as the polymerizable liquid crystal compound, the spectrum width was small and the selectivity of the reflection wavelength range was high compared with an example of using a composition only including a polymerizable liquid crystal compound not including a saturated hydrocarbon ring group.

Laminating Film Including Cholesteric Liquid Crystal Layer and Adjacent Layer, Production of Examples 21 to 26, and Comparative Example 21

[Production of Laminating Film]

A 2% N-methyl-2-pyrrolidone solution of SE-130 (manufactured by Nissan Chemical Industries, Ltd.) was prepared on the washed glass. Bar coating was performed on a glass substrate with this, and then the solution was dried in an oven at 100° C. for five minutes and then at 250° C. for 60 minutes. Thereafter, a rubbing treatment was performed at a rotation speed of 1,000 rpm to prepare a glass substrate with an alignment film.

The polymerizable composition 1 was dissolved in chloroform to obtain a dope solution having a solid content of 0.18 mass %. This dope solution was applied on a PET film using a wire bar at room temperature so that the thickness of the dry film after drying was 4.0 μm. After the coating layer was dried at room temperature for 10 seconds, the coating layer was heated in an atmosphere at 85° C. for one minute and was UV irradiated at 70° C. for five seconds at 80% output with a fusion D bulb (lamp 90 mW/cm), and a liquid crystal film was cured, so as to prepare a cholesteric liquid crystal layer.

The following coating solution for forming an adjacent layer was coated on the surface of the prepared cholesteric liquid crystal layer by using a wire bar at room temperature such that the thickness of the dry film after drying was 5.0 μm. After the coating layer was dried at room temperature for 10 seconds, the coating layer was heated in an atmosphere at 85° C. for one minute and was UV irradiated at 70° C. for five seconds at 80% output with a fusion D bulb (lamp 90 mW/cm), and an adjacent layer was formed, so as to prepare a laminating film with PET.

(Composition of Coating Solution for Forming Adjacent Layer)

| Monomer presented in the table | 2.9 parts by mass |
| --- | --- |
| Air interface alignment agent A | 0.02 parts by mass |
| Polymerization initiator OXE01 (manufactured by BASF SE) | 0.08 parts by mass |
| Methyl ethyl ketone | 7 parts by mass |

Production of Samples for Evaluation of Examples 21 to 26 and Comparative Example 21

The quartz glass plate having 50 mm×50 mm and a thickness of 2 mm was coated with the following coating solution for the adhesive layer, such that the thickness of the dry film became 5.0 μm at room temperature by using a wire bar. After the coating layer was dried at room temperature for 10 seconds, the coating layer was heated in an atmosphere at 85° C. for one minute to form an adhesive layer.

(Composition of Coating Solution for Adhesive Layer)

| VISCOAT #360 (manufactured by Osaka Organic Chemical Industry Ltd.) | 3.3 parts by mass |
| --- | --- |
| VANARESIN GH1203 (manufactured by Shin-Nakamura Chemical Co., Ltd.) | 1.3 parts by mass |
| Air interface alignment agent A | 0.1 parts by mass |
| Polymerization initiator (OXE01) (manufactured by BASF SE) | 0.1 parts by mass |
| Silane coupling agent KBM 5103 (Shin-Etsu Chemical Co., Ltd.) | 4.5 parts by mass |
| Methyl ethyl ketone | 0.7 parts by mass |

The laminating film with PET was bonded to the adhesive layer on the quartz glass plate such that the adjacent layer and the adhesive layer were in contact with each other. Thereafter, UV irradiation was performed at 70° C. for five seconds at an 80% output with a fusion D bulb (Lamp 90 mW/cm), and the PET was peeled off to prepare a sample.

[Evaluation]

A UV spectrum (Shimadzu UV-3100 PC UV-Visible Near Infrared Analytical Photometer, Measuring Wavelength: 700 to 500 nm, Slit width: 1 nm, transmittance measurement) of the obtained sample before and after a temperature and humidity resistance test below was measured, the shift amount of the selective reflection wavelength was measured, so as to evaluate durability. In the temperature and humidity resistance test, samples were put into a constant temperature and constant humidity chamber (PR-3ST, manufactured by Espec Corporation) at 85° C. and 85%, and left to stand for 280 hours.

Results thereof are as presented in Table 2.

What is claimed is:

1. A polymerizable composition comprising: a polymerizable liquid crystal compound; and a urethane (meth)acrylate monomer, wherein the polymerizable liquid crystal compound is represented by Formula (I), and the urethane (meth)acrylate monomer includes a urethane bond represented by Formula (II) and three or more (meth)acryloyl groups,

in Formula (I),

A's each independently represent an unsubstituted cyclohexylene group or a phenylene group having a group represented by $-C(=O)-X^3-Sp^3-Q^3$ as a substituent, provided that the polymerizable liquid crystal compound includes at least one unsubstituted cyclohexylene group and at least one phenylene group having a $-C(=O)-X^3-Sp^3-Q^3$ group as a substituent, L represents a single bond, or a linking group selected from the group consisting of $-CH_2O-$, $-OCH_2-$, $-(CH_2)_2OC(=O)-$, $-C(=O)O(CH_2)_2-$, $-C(=O)O-$, $-OC(=O)-$, $-OC(=O)O-$, $-CH=CH-C(=O)O-$, and $-OC(=O)-CH=CH-$, m represents an integer of 4 to 12, $Sp^1$ and $Sp^2$ each independently represent a single bond or a linking group selected from the group consisting of a linear or branched alkylene group having 1 to 20 carbon atoms and a group in which one or more $-CH_2-$'s in a linear or branched alkylene group having 1 to 20 carbon atoms are substituted with $-O-$, $-S-$, $-NH-$, $-N(CH_3)-$, $-C(=O)-$, $-OC(=O)-$, or $-C(=O)O-$, $Q^1$ and $Q^2$ each independently represent a hydrogen atom or a polymerizable group selected from the group consisting of groups represented by Formulae Q-1 to Q-5:

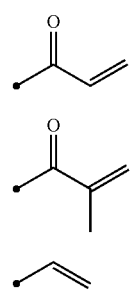

Q-1

Q-2

Q-3

TABLE 2

| | Example 21 | Example 22 | Example 23 | Example 24 | Example 25 | Example 26 | Comparative Example 21 |
| --- | --- | --- | --- | --- | --- | --- | --- |
| Monomer | U-306T | U-306I | U-4HA | U-10HA | U-10PA | U-15HA | Polymerizable monomer 1 |
| Durability evaluation Shift amount of the selective reflection wavelength (nm) | 14 | 14 | 15 | 10 | 10 | 14 | 31 |

-continued

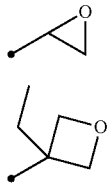

(Q-4)

(Q-5)

here, at least one of $Q^1$ and $Q^2$ represents a polymerizable group, and

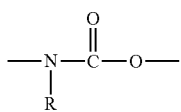

(II)

in Formula (II), R represents a hydrogen atom or a hydrocarbon group, the substituent in the recited groups that may have a substituent, is selected from the group consisting of an alkyl group, a cycloalkyl group, an alkoxy group, an alkyl ether group, an amide group, an amino group, a halogen atom, and a group obtained by combining two or more of the above substituents or a substituent represented by —C(=O)—$X^3$-$Sp^3$-$Q^3$, in —C(=O)—$X^3$-$Sp^3$-$Q^3$, $X^3$ represents a single bond, —O—, —S—, or —N($Sp^4$-$Q^4$)-, or represents a nitrogen atom that forms a ring structure together with $Q^3$ and $Sp^3$, each $Sp^3$ independently represents a group in which one or more —CH$_2$-'s in a linear or branched alkylene group having 1 to 20 carbon atoms are substituted with —O—, —S—, —NH—, —N(CH$_3$)—, —C(=O)—, —OC(=O)—, or —C(=O)O—, each $Sp^4$ independently represents a single bond or a linking group selected from the group consisting of a linear or branched alkylene group having 1 to 20 carbon atoms and a group in which one or more —CH$_2$-'s in a linear or branched alkylene group having 1 to 20 carbon atoms are substituted with —O—, —S—, —NH—, —N(CH$_3$)—, —C(=O)—, —OC(=O)—, or —C(=O)O—, and $Q^3$ and $Q^4$ each independently represents a hydrogen atom, a cycloalkyl group, a group in which one or more —CH$_2$-'s in a cycloalkyl group are substituted with —O—, —S—, —NH—, —N(CH$_3$)—, —C(=O)—, —OC(=O)—, or —C(=O)O—, or any one polymerizable group selected from the group consisting of groups represented by Formulae Q-1 to Q-5 above.

2. The polymerizable composition according to claim 1, wherein, in Formula (II), R represents a hydrogen atom.

3. The polymerizable composition according to claim 1, wherein both of $Q^1$ and $Q^2$ are polymerizable groups represented by Formula Q-1 or Q-2.

4. The polymerizable composition according to claim 1, wherein L is —C(=O)O— or —OC(=O)—.

5. The polymerizable composition according to claim 1, wherein both of $Q^1$ and $Q^2$ are polymerizable groups represented by Formula Q-1 or Q-2, and L is —C(=O)O— or —OC(=O)—.

6. The polymerizable composition according to claim 1, wherein m is 4 to 5.

7. The polymerizable composition according to claim 1, wherein the total mass of the urethane (meth)acrylate monomer is 1 to 10 mass % with respect to the total solids content of the polymerizable composition.

8. The polymerizable composition according to claim 1, further comprising: a polymerization initiator.

9. The polymerizable composition according to claim 1, further comprising: a chiral compound.

10. A film comprising: a layer obtained by curing the polymerizable composition according to claim 1.

11. The polymerizable composition according to claim 1, wherein the polymerizable liquid crystal compound is represented by Formula (I-21) or (I-31):

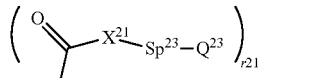

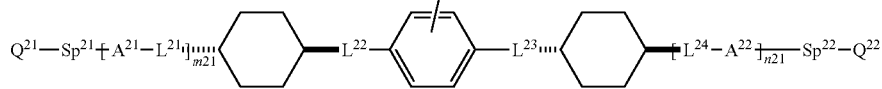

(I-21)

wherein in Formula (I-21), $A^{21}$ and $A^{22}$ each independently represents a trans-1,4-cyclohexylene group that may have a substituent, an arylene group that may have a substituent, or a heteroarylene group that may have a substituent, all of the substituents each independently represents one to four substituents selected from the group consisting of —CO—$X^{21}$-$Sp^{23}$-$Q^{23}$, an alkyl group, and an alkoxy group, m21 represents an integer of 1 or 2, n21 represents an integer of 0 or 1, in a case where m21 represents 2, n21 represents 0, in a case where m21 represents 2, two $A^{21}$'s may be identical to or different from each other, at least one of $A^{21}$ and $A^{22}$ is an arylene group that may have a substituent or a heteroarylene group that may have a substituent, $L^{21}$, $L^{22}$, $L^{23}$, and $L^{24}$ each independently represents a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, $X^{21}$ represents —O—, —S—, or —N($Sp^{25}$-$Q^{25}$)-, or represents a nitrogen atom that forms a ring structure together with $Q^{23}$ and $Sp^{23}$, $r^{21}$ represents an integer of 1 to 4, $Sp^{21}$, $Sp^{22}$, $Sp^{24}$, and $Sp^{25}$ each independently represents a single bond or a linking group selected from the group consisting of a linear or branched alkylene group having 1 to 20 carbon atoms and a group in which one or more —$CH_2$—'s in a linear or branched alkylene group having 1 to 20 carbon atoms are substituted with —O—, —S—, —NH—, —N($CH_3$)—, —C(=O)—, —OC(=O)—, or —C(=O)O—, each $Sp^{23}$ independently represents a group in which one or more —$CH_2$—'s in a linear or branched alkylene group having 1 to 20 carbon atoms are substituted with —O—, —S—, —NH—, —N($CH_3$)—, —C(=O)—, —OC(=O)—, or —C(=O)O—, $Q^{21}$ and $Q^{22}$ each independently represents any one polymerizable group selected from the group consisting of groups represented by Formulae Q-1 to Q-5, $Q^{23}$ represents a hydrogen atom, a cycloalkyl group, a group in which one or more —$CH_2$—'s in a cycloalkyl group are substituted with —O—, —S—, —NH—, —N($CH_3$)—, —C(=O)—, —OC(=O)—, or —C(=O)O—, any one polymerizable group selected from the group consisting of groups represented by Formulae Q-1 to Q-5, or a single bond in a case where $X^{21}$ is a nitrogen atom that forms a ring structure together with $Q^{23}$ and $Sp^{23}$, and $Q^{25}$ represents a hydrogen atom, a cycloalkyl group, a group in which one or more —$CH_2$—'s in a cycloalkyl group are substituted with —O—, —S—, —NH—, —N($CH_3$)—, —C(=O)—, —OC(=O)—, or —C(=O)O—, or any one polymerizable group selected from the group consisting of groups represented by Formulae Q-1 to Q-5, and, in a case where $Sp^{25}$ is a single bond, $Q^{25}$ is not a hydrogen atom;

all of the substituents each independently represents one to four substituents selected from the group consisting of an alkyl group, an alkoxy group, and —C(=O)—$X^{33}$-$Sp^{33}$-$Q^{33}$, m31 represents an integer of 1 or 2, and m32 represents an integer of 0 to 2, in a case where m31 and m32 represent 2, two $Z^{31}$'s and two $Z^{32}$'s may be identical to or different from each other, $L^{31}$ and $L^{32}$ each independently represents a linking group selected from the group consisting of a single bond, or a linking group selected from the group consisting of —$CH_2$O—, —O$CH_2$—, —($CH_2$)$_2$OC(=O)—, —C(=O)O($CH_2$)$_2$—, —C(=O)O—, —OC(=O)—, —OC(=O)O—, —CH=CH—C(=O)O—, and —OC(=O)—CH=CH—, $T^{33}$ represents -$Sp^{35}$-$Q^{35}$, $Sp^{31}$, $Sp^{32}$, $Sp^{34}$, and $Sp^{35}$ each independently represents a single bond or a linking group selected from the group consisting of a linear or branched alkylene group having 1 to 20 carbon atoms and a group in which one or more —$CH_2$—'s in a linear or branched alkylene group having 1 to 20 carbon atoms are substituted with —O—, —S—, —NH—, —N($CH_3$)—, —C(=O)—, —OC(=O)—, or —C(=O)O—, each $Sp^{33}$ independently represents a group in which one or more —$CH_2$—'s in a linear or branched alkylene group having 1 to 20 carbon atoms are substituted with —O—, —S—, —NH—, —N($CH_3$)—, —C(=O)—, —OC(=O)—, or —C(=O)O—, $Q^{31}$ and $Q^{32}$ each independently represents any one polymerizable group selected from the group consisting of groups represented by Formulae (Q-1) to (Q-5), and

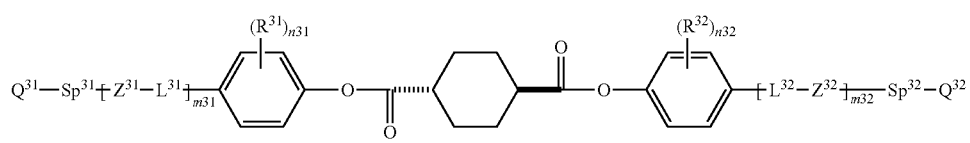

(I-31)

wherein in Formula (I-31), $R^{31}$ and $R^{32}$ each independently represents a group selected from the group consisting of an alkyl group, an alkoxy group, and —C(=O)—$X^{33}$-$Sp^{33}$-$Q^{33}$, provided that at least one of $R^{31}$ and $R^{32}$ represents —C(=O)—$X^{33}$-$Sp^{33}$-$Q^{33}$, n31 and n32 each independently represents an integer of 0 to 4, $X^{33}$ represents a single bond, —O—, —S—, or —N($Sp^{34}$-$Q^{34}$)-, or represents a nitrogen atom that forms a ring structure together with $Q^{33}$ and $Sp^{33}$, $Z^{31}$ represents an arylene group that may have a substituent or a heteroarylene group that may have a substituent, $Z^{32}$ represents a trans-1,4-cyclohexylene group that may have a substituent, an arylene group that may have a substituent, or a heteroarylene group that may have a substituent, $Q^{33}$, $Q^{34}$, and $Q^{35}$ each independently represents a hydrogen atom, a cycloalkyl group, a group in which one or more —$CH_2$—'s in a cycloalkyl group are substituted with —O—, —S—, —NH—, —N($CH_3$)—, —C(=O)—, —OC(=O)—, or —C(=O)O—, any one polymerizable group selected from the group consisting of groups represented by Formulae (Q-1) to (Q-5), $Q^{33}$ may represent a single bond in a case where a ring structure is formed together with X and $Sp^{33}$, and $Q^{34}$ is not hydrogen atom in a case where $Sp^{34}$ is a single bond.

12. The polymerizable composition according to claim 1, wherein m in Formula (I) is 5.

13. The polymerizable composition according to claim 1, wherein the content of the urethane (meth)acrylate monomer is 1.5 mass % to 5.0 mass % with respect to the total mass solids content of the polymerizable composition.

* * * * *